(12) United States Patent
Omari et al.

(10) Patent No.: US 12,254,424 B2
(45) Date of Patent: Mar. 18, 2025

(54) LEVERAGING TRAFFIC PATTERNS TO UNDERSTAND TRAFFIC RULES

(71) Applicant: Lyft, Inc., San Francisco, CA (US)

(72) Inventors: Sammy Omari, Menlo Park, CA (US); Sameer Qureshi, Sunnyvale, CA (US)

(73) Assignee: Lyft, Inc., San Francisco, CA (US)

( * ) Notice: Subject to any disclaimer, the term of this patent is extended or adjusted under 35 U.S.C. 154(b) by 1027 days.

(21) Appl. No.: 16/700,544

(22) Filed: Dec. 2, 2019

(65) Prior Publication Data

US 2021/0166145 A1 Jun. 3, 2021

(51) Int. Cl.
| | |
|---|---|
| *G06N 7/01* | (2023.01) |
| *G06N 20/00* | (2019.01) |
| *G08G 1/01* | (2006.01) |
| *G08G 1/056* | (2006.01) |

(52) U.S. Cl.
CPC .............. *G06N 7/01* (2023.01); *G06N 20/00* (2019.01); *G08G 1/0129* (2013.01); *G08G 1/056* (2013.01)

(58) Field of Classification Search
CPC ........ G06N 7/01; G06N 20/00; G08G 1/0129; G08G 1/056; G08G 1/0112; G08G 1/163; G08G 1/166
See application file for complete search history.

(56) References Cited

U.S. PATENT DOCUMENTS

| | | | | |
|---|---|---|---|---|
| 11,537,134 | B1* | 12/2022 | Wiest ................... | G06N 3/0455 |
| 2004/0230345 | A1* | 11/2004 | Tzamaloukas ...... | H04W 84/005 |
| | | | | 701/1 |
| 2016/0282879 | A1* | 9/2016 | Ichikawa ............. | G05D 1/0276 |
| 2018/0189578 | A1* | 7/2018 | Yang .................... | G06V 10/457 |
| 2019/0073899 | A1* | 3/2019 | Radomy ................. | G08G 1/07 |
| 2020/0135030 | A1* | 4/2020 | Krivokon ............... | G08G 1/095 |
| 2020/0209873 | A1* | 7/2020 | Chen .................. | G01C 21/3822 |
| 2020/0364469 | A1* | 11/2020 | Fowe ...................... | G06F 16/29 |
| 2021/0065544 | A1* | 3/2021 | Bai ........................ | G06N 20/00 |

\* cited by examiner

*Primary Examiner* — Tyler J Lee
(74) *Attorney, Agent, or Firm* — Baker Botts L.L.P.

(57) ABSTRACT

In one embodiment, a method includes determining a connectivity model associated with a region of a road network, wherein the connectivity model was trained using vehicle traffic-pattern data comprising a first lane identifier and a second lane identifier indicating one or more lanes associated with a vehicle trajectory through the region and a traffic-light state corresponding to signal information of traffic lights in the region when a vehicle moved through the region, determining for at least one egress lane in the region based on the connectivity model a lane relationship indicating one or more ingress lanes in the region onto which a vehicle in the egress lane can move and one or more governing traffic lights selected from the traffic lights in the region that govern the egress lane, and encoding the lane relationship and the one or more governing traffic lights into a map of the region.

24 Claims, 13 Drawing Sheets

LEVERAGING TRAFFIC PATTERNS TO UNDERSTAND TRAFFIC RULES

BACKGROUND

Traffic is formally organized in many regions, with marked lanes, junctions, intersections, interchanges, traffic signals, or signs. Organized traffic generally has well-established priorities, lanes, right-of-way, and traffic control at intersections. Some regions may have detailed and complex traffic rules of the road while others rely more on drivers' common sense and driving etiquette. Traffic rules govern traffic and regulate vehicles, which may have developed over time to facilitate the orderly and timely flow of traffic. There are also unwritten local rules of the road, which are generally understood by local drivers. In addition to the rules applicable by default, traffic signs and traffic lights must be obeyed, and instructions may be given by a police officer, either routinely (on a busy crossing instead of traffic lights) or as road traffic control around a construction zone, accident, or other road disruption.

DESCRIPTION OF EXAMPLE EMBODIMENTS

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Figure 1:
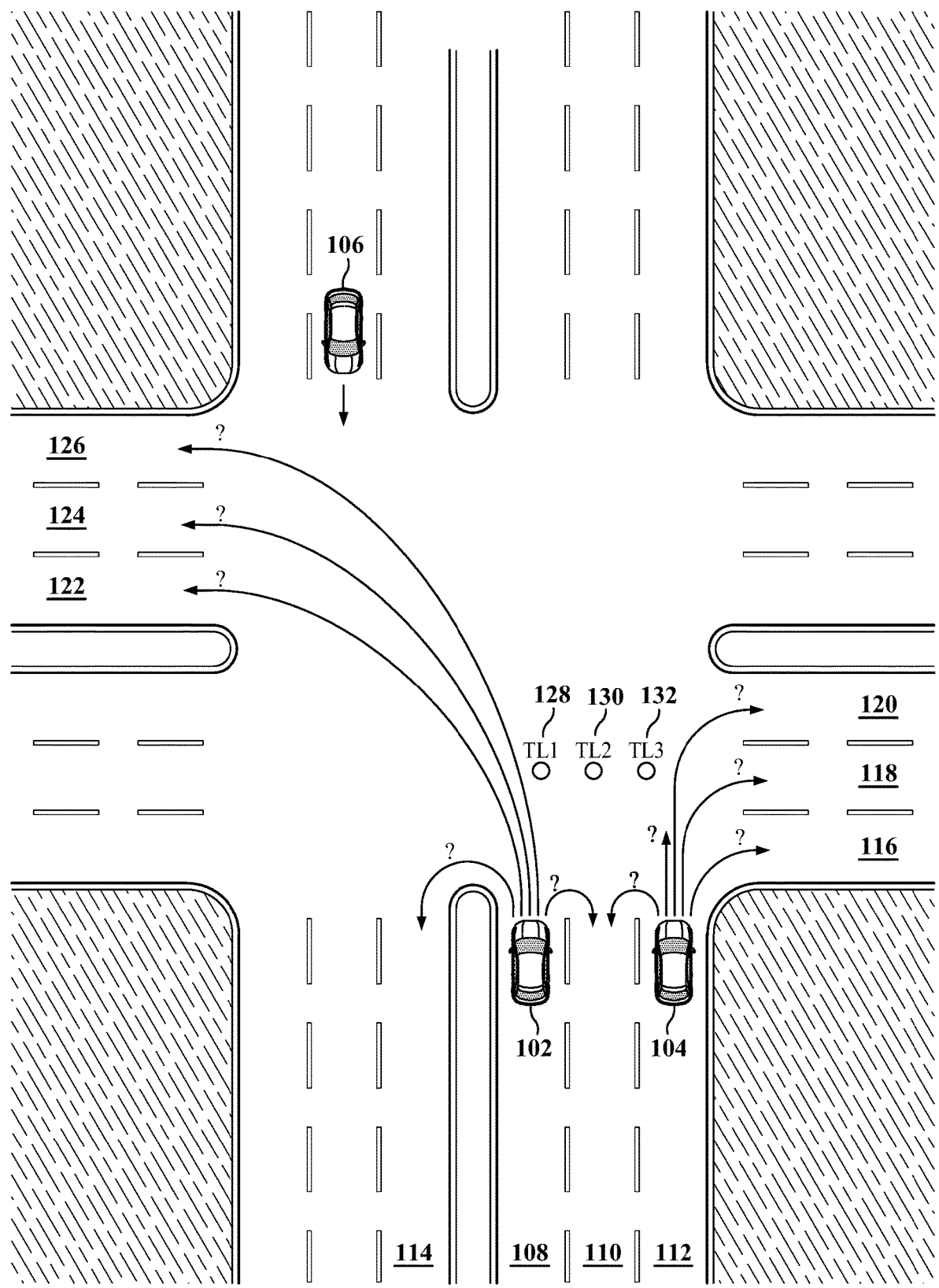
FIG. 1 illustrates an example intersection where autonomous vehicles face difficulties deciding how to make a turn.

A geographical region may have its own lane connectivity and traffic rules regulating how drivers should drive their vehicles. The lane connectivity may indicate the relationships between different lanes. As an example and not by way of limitation, the region may comprise one of more of an intersection, a parking lot, a two-way street, or a driveway. Although humans can easily identify lane connectivity and traffic rules in a region and drive accordingly, it is not necessarily clear to an autonomous vehicle how it should drive within such region. FIG. 1 illustrates an example intersection where autonomous vehicles face difficulties deciding how to make a turn. In FIG. 1, a vehicle 102 may be at lane 108. Another vehicle 104 may be at lane 112. Both vehicles may need to decide how to make a turn. A vehicle 106 may be coming from an opposite direction with respect to vehicle 102. Besides multiple lanes, the intersection also comprises three traffic lights (TL), i.e., TL1 128, TL2 130, and TL3 132. Each traffic light may have green, yellow, and red signals intermittently. As indicated in FIG. 1, vehicle 102 may have difficulty deciding how to make a turn from lane 108. For example, can vehicle 102 make a U-turn from lane 108 to lane 114? If such U-turn is allowed, how should vehicle 102 make the U-turn and is there any traffic light vehicle 102 should obey? As another example, can vehicle 102 make a U-turn from lane 108 to lane 110? As yet another example, when vehicle 102 makes a left turn from lane 108, should it turn to lane 122, lane 124, or lane 126? In addition, during such a left turn, should vehicle 102 pay attention to the oncoming vehicle 106 (e.g., yield to vehicle 106)? Furthermore, is there any traffic light vehicle 102 should obey when making a left turn? Similarly, vehicle 104 may also have difficulties deciding how to make a turn from lane 112. For example, can vehicle 104 make a U-turn from lane 112 to lane 110? As another example, when vehicle 104 makes a right turn from lane 112, should it turn to lane 116, lane 118, or lane 120? In addition, is there any traffic light vehicle 104 should obey when making a right turn? All the aforementioned difficulties pose substantial challenges to autonomous driving as the autonomous vehicles cannot think like human beings who can rely on prior knowledge and past experience.

Figure 2A:
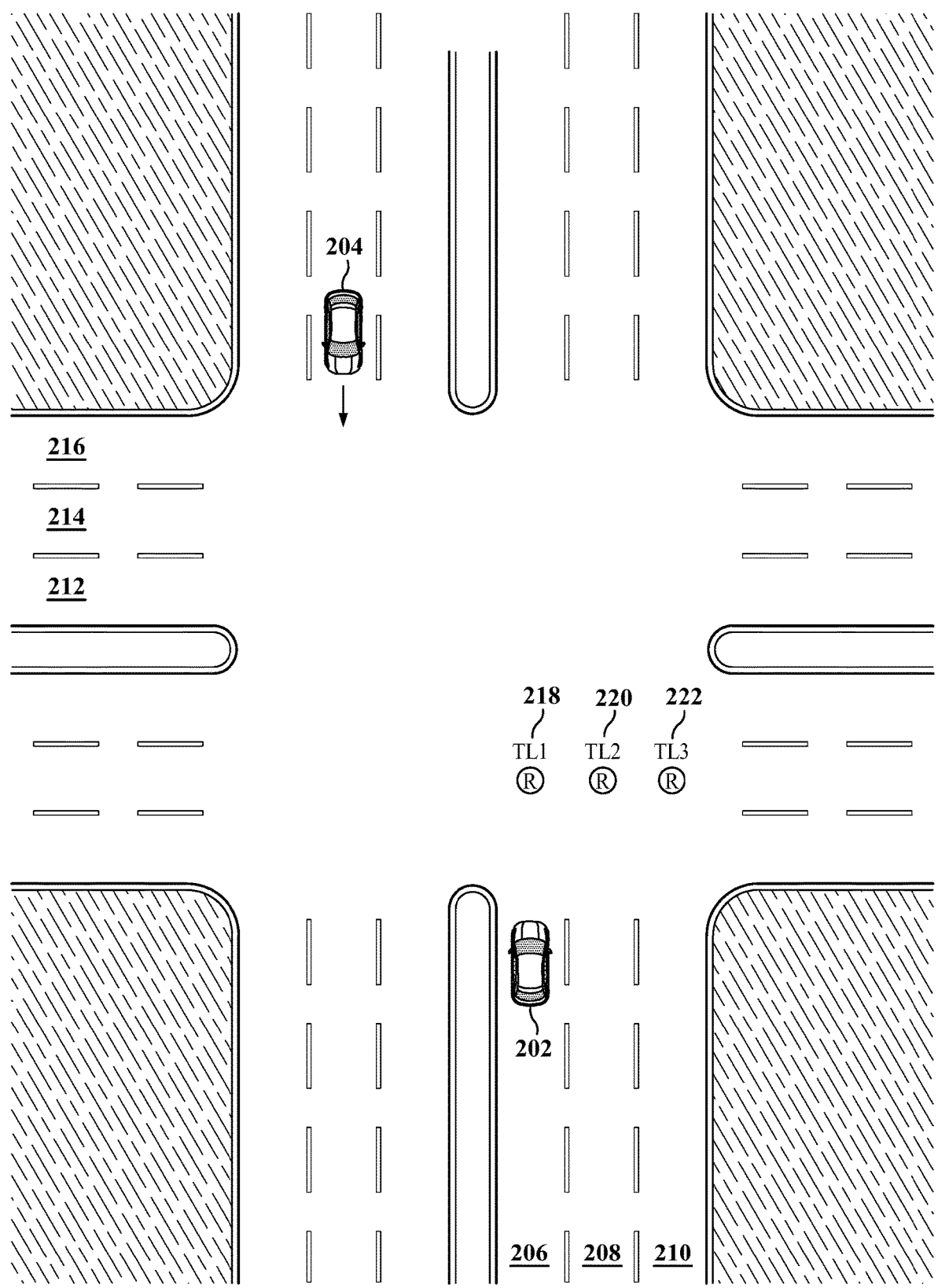
FIG. 2A illustrates a starting stage of a left turn captured in a region.
Figure 2B:
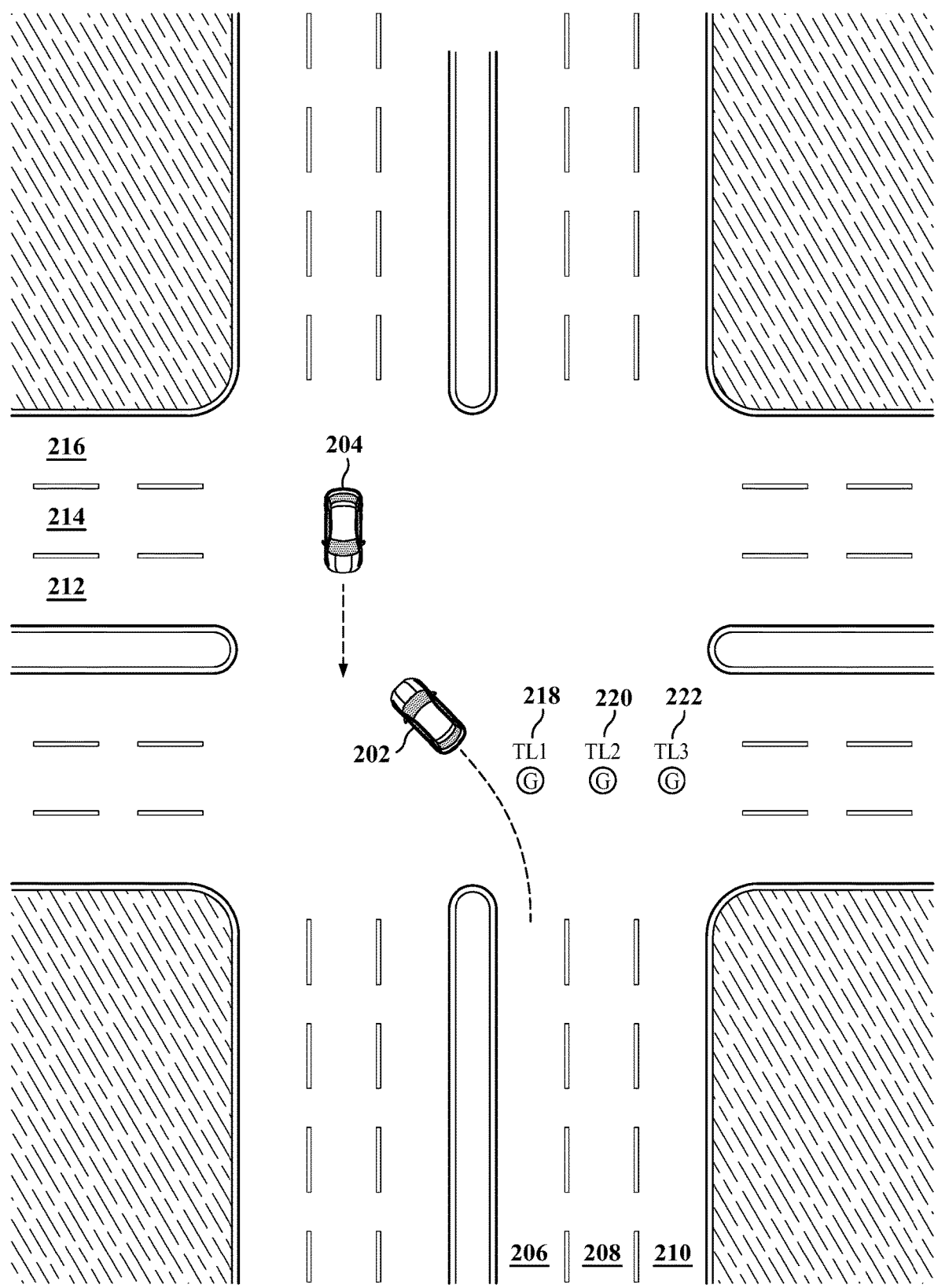
FIG. 2B illustrates an ongoing stage of the left turn captured in the region.
Figure 2C:
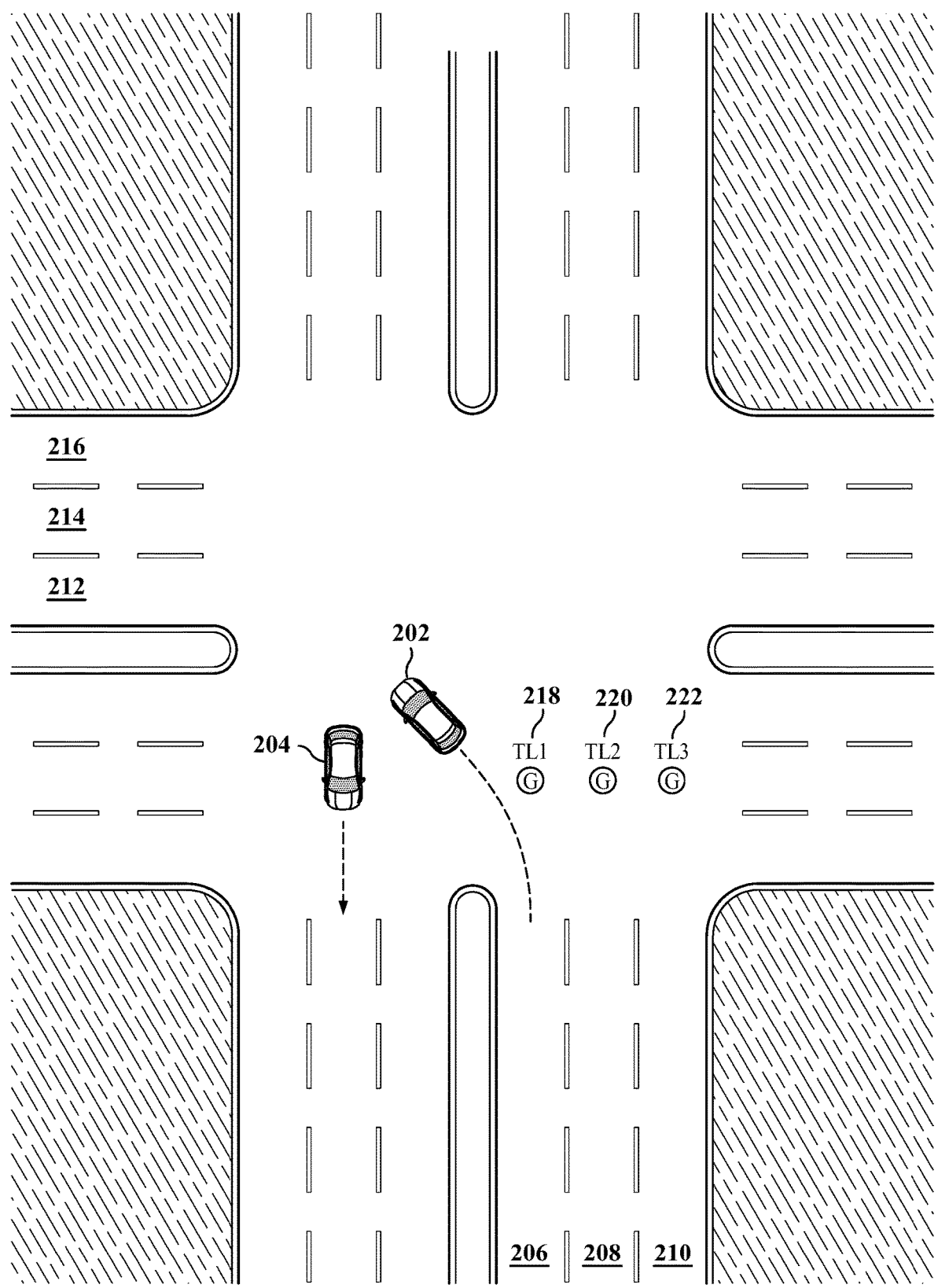
FIG. 2C illustrates another ongoing stage of the left turn captured in the region.
Figure 2D:
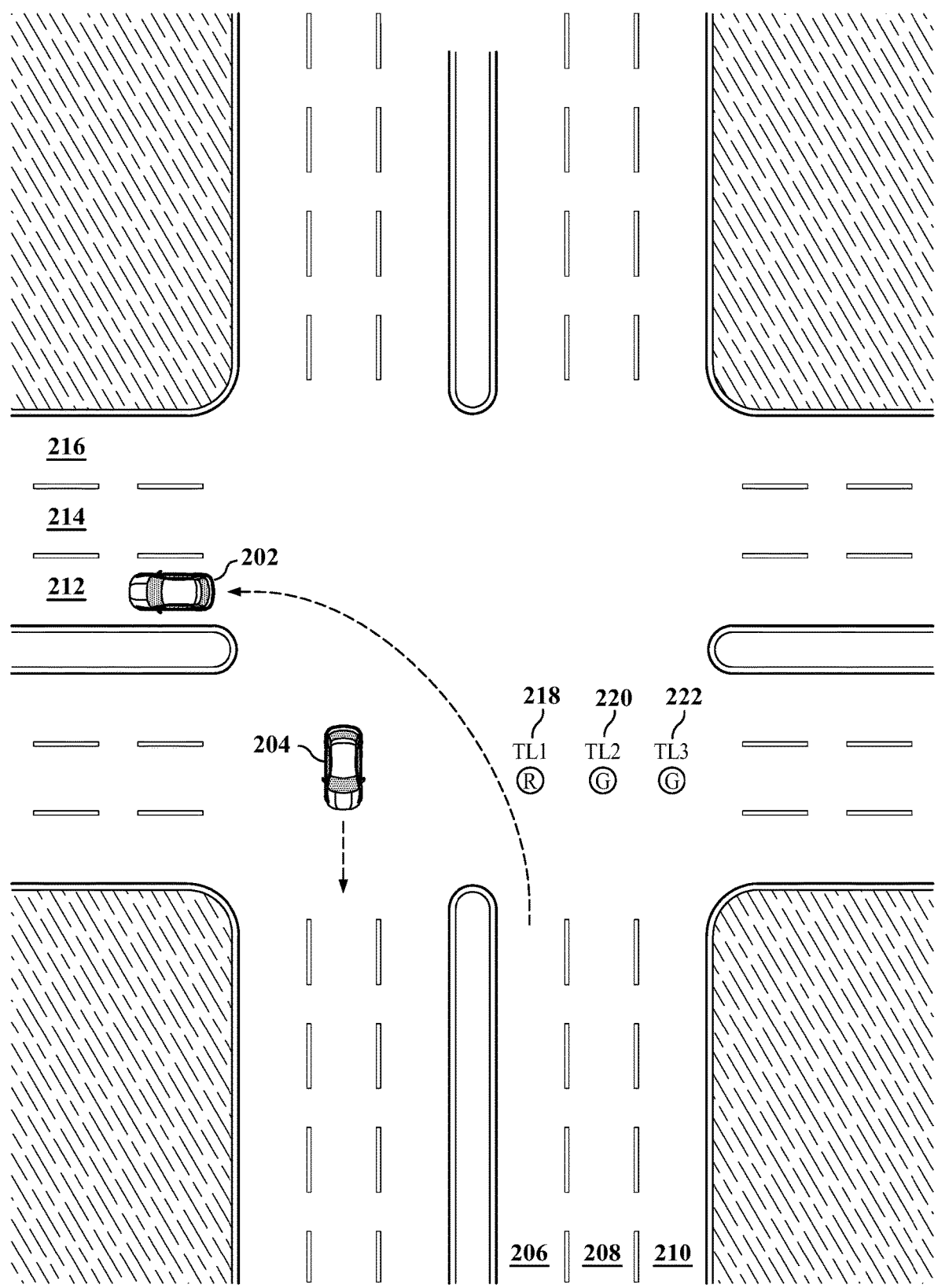
FIG. 2D illustrates an ending stage of the left turn captured in the region.

To address the above challenge, the embodiments disclosed herein train a connectivity model which learns the lane connectivity and traffic rules of a region. Particular embodiments may analyze a plurality of vehicle traffic-pattern data capturing how human drivers drive within such region. In particular embodiments, the vehicle traffic-pattern data may be based on captured sensor data. As an example and not by way of limitation, the sensor data captured in the region may comprise images, videos, LiDAR point clouds, radar signals, or any combination thereof. In particular embodiments, the vehicle traffic-pattern data may be captured by multiple different types of sensors, e.g., optical camera, lidar, radar, infrared camera, or any other suitable sensors that arise in the future, etc. FIGS. 2A-2D illustrate an example left turn captured in a region based on the sensor data. FIG. 2A illustrates a starting stage of a left turn captured in a region. In FIG. 2A, a vehicle 202 may be stopped at lane 206 in front of traffic light (TL1) 218, traffic light (TL2) 220, and traffic light (TL3) 222. There are two other lanes, i.e., lane 208 and lane 210, beside lane 206. The three traffic lights may be all red (R) at this stage. Another vehicle 204 may be stopped at a lane in the opposite direction. FIG. 2B illustrates an ongoing stage of the left turn captured in the region. After traffic light (TL1) 218 turns green (G), vehicle 202 starts to move to the middle section of the intersection. Traffic light (TL2) 220 and traffic light (TL3) 222 may be also green at this stage. However, vehicle 204 may be approaching from the opposite direction. Vehicle 202 may then stop and wait for vehicle 204 to pass. FIG. 2C illustrates another ongoing stage of the left turn captured in the region. After vehicle 204 passes, vehicle 202 starts to move again leaving the middle section of the intersection. The three traffic lights may be still green at this stage. FIG. 2D illustrates an ending stage of the left turn captured in the region. Vehicle 202 arrives at lane 212, which completes the left turn. As displayed in FIG. 2D, lane 214 and lane 216 are adjacent to lane 212. At this stage, traffic light (TL1) 218 may have turned red whereas traffic light (TL2) 220 and traffic light (TL3) 222 are still green. In particular embodiments, the sensory data may be captured by sensors installed on one or more vehicles which are designated to a particular region. These vehicles may stay in the region for a considerable amount of time to capture sensory data. In alternative embodiments, the sensory data may be captured by sensor installed on a plurality of vehicles which drive through the region at different time. The number of vehicles may be considerably large to capture a sufficient amount of sensory data that covers various scenarios of the traffic at different times. In alternative embodiments, the sensory data may be captured by sensors that are not installed on vehicles. For example, the sensory data may be satellite images, images/videos captured by cameras installed in the region (e.g., traffic monitoring cameras sitting on top of traffic lights), images/videos captured by pedestrians, or any combination thereof. For all the aforementioned sensory data, the embodiments disclosed herein may process them to make them coherent to be suitable for traffic pattern mining. The embodiments disclosed herein may additionally incorporate location information into these sensory data to be able to infer lane connectivity and traffic rules that are region-specific.

In particular embodiments, the computing system may extract vehicle trajectories of different vehicles from the sensor data and analyze them to uncover traffic patterns. Based on the traffic patterns, the computing system may further learn the lane connectivity and traffic rules using one or more models. The learned lane connectivity and traffic rules may be used to assist autonomous driving. As an example and not by way of limitation, the traffic patterns may reveal virtual lane dividers through the region and the traffic rules may further indicate that a vehicle should drive within two adjacent virtual lane dividers. As another example and not by way of limitation, the traffic patterns may reveal all the vehicles made left turns from a particular lane when the traffic light governing that lane was green. The traffic patterns may be used to learn a traffic rule that a left turn can only happen when the governing traffic light is green. This learned traffic rule may be similarly used to assist autonomous driving. As yet another example and not by way of limitation, the traffic patterns may reveal the left-turn traffic always yields to the oncoming traffic. As a result, the computing system may infer a traffic rule that left-turn traffic must yield to the oncoming traffic, which may be further used to assist autonomous driving.

In particular embodiments, the computing system may determine a connectivity model associated with a region of a road network. The connectivity model may be trained using vehicle traffic-pattern data in the region. In particular embodiments, the vehicle traffic-pattern data may comprise a first lane identifier and a second lane identifier indicating one or more lanes associated with a vehicle trajectory through the region and a traffic-light state corresponding to signal information of one or more traffic lights in the region when a vehicle moved through the region. In particular embodiments, the computing system may determine, based on the connectivity model, for at least one egress lane in the region: a lane relationship indicating one or more ingress lanes in the region onto which a vehicle in the egress lane can move, and one or more governing traffic lights, selected from the one or more traffic lights in the region, that govern the egress lane. In particular embodiments, the computing system may further encode the lane relationship and the one or more governing traffic lights into a map of the region.

In particular embodiments, the computing system may extract, based on the sensor data, a plurality of vehicle trajectories indicating a path that a plurality of vehicles have taken when moving through the region. Accordingly, the vehicle traffic-pattern data may further comprise the plurality of vehicle trajectories. The computing system may first identify traffic going from the egress lane to the ingress lane by analyzing the vehicle trajectories. The computing system may then reason about the virtual geometric areas of the identified traffic.

Figure 3A:
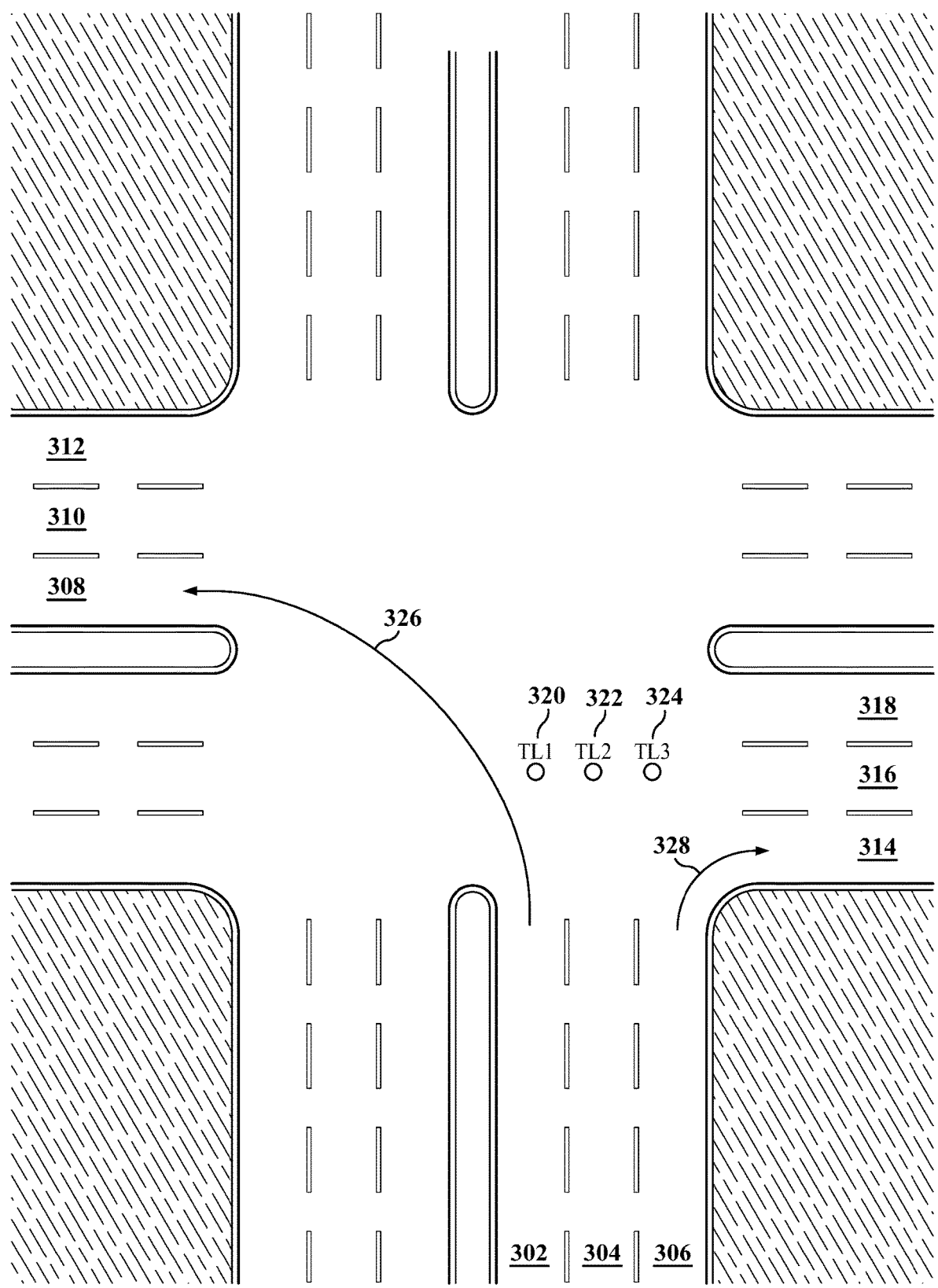
FIG. 3A illustrates example vehicle trajectories.

FIG. 3A illustrates example vehicle trajectories. FIG. 3A shows an intersection with multiple lanes, e.g., lane 302, lane 304, lane 306, lane 308, lane 310, lane 312, lane 314, lane 316, and lane 318. There are three traffic lights, i.e., traffic light (TL1) 320, traffic light (TL2) 322, and traffic light (TL3) 324. FIG. 3A shows two vehicle trajectories, i.e., trajectory 326 and trajectory 328. Trajectory 326 corresponds to a left turn made by a vehicle and trajectory 328 corresponds to a right turn made by another vehicle. Table 1 illustrate example lane connectivity generated based on vehicle trajectories corresponding to FIG. 3A. In Table 1, "0" indicates there is no vehicle moving from a corresponding egress lane to a corresponding ingress lane whereas "1" indicates there is a vehicle moving from a corresponding egress lane to a corresponding ingress lane. As an example and not by way of limitation, there is a vehicle moving from lane 302 to lane 308 and a vehicle from lane 306 to lane 314. There is no vehicle movement between any other two lanes.

TABLE 1

Lane connectivity generated based on vehicle trajectories.

| Egress Lane | Ingress Lane | | | | | | | |
|---|---|---|---|---|---|---|---|---|
| | 302 | 306 | 308 | 310 | 312 | 314 | 316 | 318 |
| 302 | 0 | 0 | 1 | 0 | 0 | 0 | 0 | 0 |
| 304 | 0 | 0 | 0 | 0 | 0 | 0 | 0 | 0 |
| 306 | 0 | 0 | 0 | 0 | 0 | 1 | 0 | 0 |
| 308 | 0 | 0 | 0 | 0 | 0 | 0 | 0 | 0 |
| 310 | 0 | 0 | 0 | 0 | 0 | 0 | 0 | 0 |
| 312 | 0 | 0 | 0 | 0 | 0 | 0 | 0 | 0 |
| 314 | 0 | 0 | 0 | 0 | 0 | 0 | 0 | 0 |
| 316 | 0 | 0 | 0 | 0 | 0 | 0 | 0 | 0 |
| 318 | 0 | 0 | 0 | 0 | 0 | 0 | 0 | 0 |

Figure 3B:
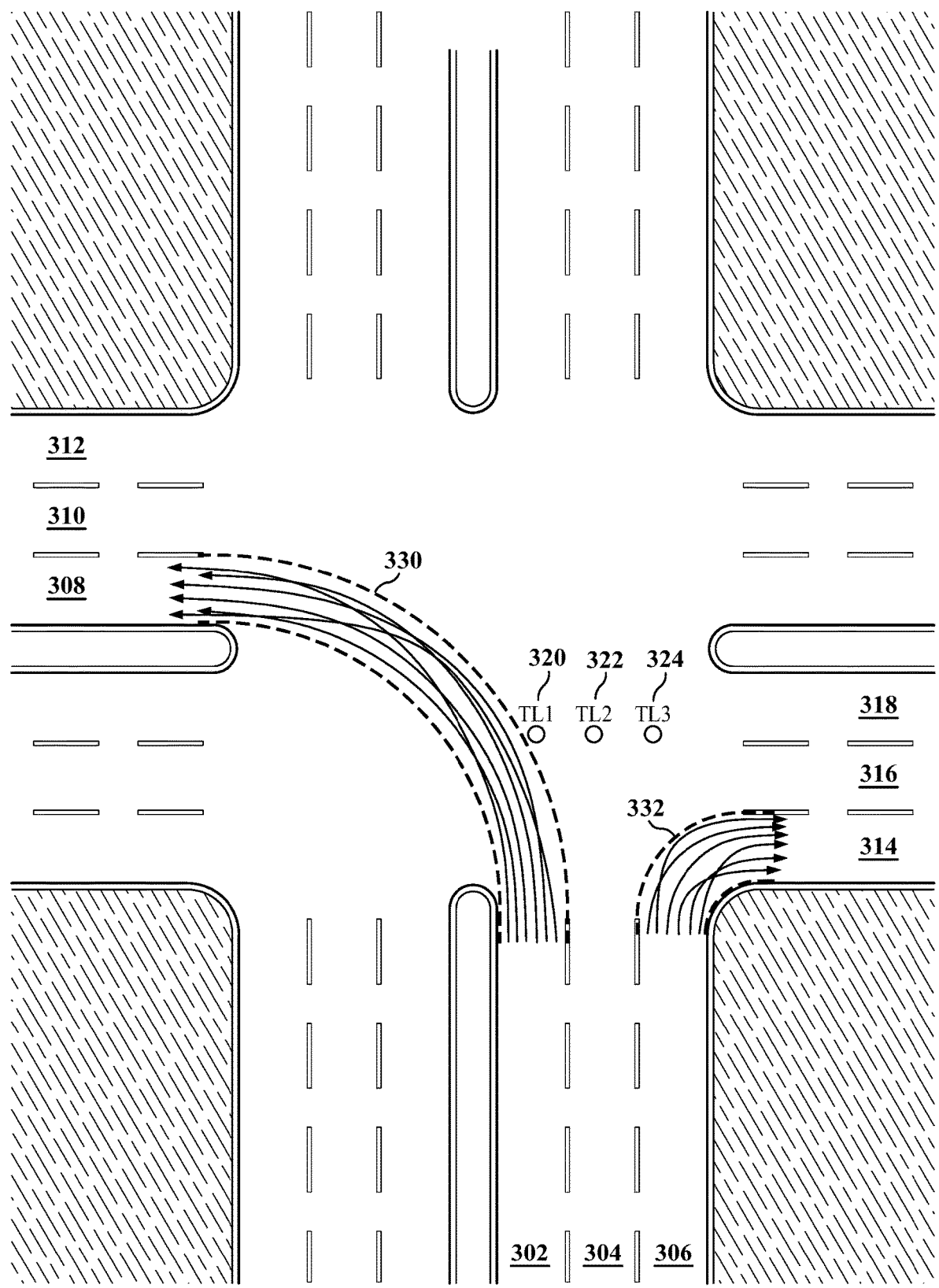
FIG. 3B illustrates example vehicle trajectories revealing example traffic patterns.

FIG. 3B illustrates example vehicle trajectories revealing example traffic patterns. In FIG. 3B, there are multiple vehicle trajectories corresponding to left turns made by multiple vehicles. These vehicle trajectories characterize a geometric area 330, which may reveal a traffic pattern that any vehicle turning left from lane 302 to lane 308 should drive within this geometric area 330. Similarly, there are multiple vehicle trajectories corresponding to right turns made by multiple vehicles. These vehicle trajectories characterize a geometric area 332, which may reveal a traffic pattern that any vehicle turning right from lane 306 to lane 314 should drive within this geometric area 332.

In particular embodiments, a computing system may correlate the vehicle trajectories with the traffic-light states, based on which the computing system may learn the traffic rules. Traffic-light states may be based on the signal information of one or more relevant traffic lights. The signal information of the one or more traffic lights may indicate each of the one or more traffic lights being green, blinking green, yellow, blinking yellow, red, or blinking red. As an example and not by way of limitation, the computing system may determine if there is a correlation between a traffic-light state and a vehicle trajectory, e.g., from lane 302 to lane 308 as displayed in FIG. 3A. Table 2 illustrates example possible lane connectivity associated with traffic-light state corresponding to FIG. 3A.

TABLE 2

Example possible lane connectivity associated with traffic-light state.

| Ingress Lane | Egress Lane | TL1 | TL2 | Tl3 |
|---|---|---|---|---|
| 302 | 308 | Green | Green | Green |
| 302 | 308 | Green | Red | Red |
| 302 | 308 | Green | Red | Green |
| 304 | 314 | Green | Green | Green |
| 304 | 314 | Green | Red | Green |
| 304 | 314 | Red | Red | Green |
| 304 | 314 | Green | Green | Red |
| 3304 | 314 | Green | Red | Red |

In particular embodiments, the computing system may additionally take into account of the time information when training the connectivity model. In particular embodiments, vehicle trajectories may be time-series data. Accordingly, the vehicle traffic-pattern data may further comprise a time at which the vehicle arrived at a predetermined location in a first lane corresponding to the first lane identifier. The traffic-light state may correspond to signal information of the one or more traffic lights at the first time. In particular embodiments, the computing system may analyze the vehicle trajectories with respect to time information. As an example and not by way of limitation, the computing system may analyze, for each of the vehicle trajectories, the time when a vehicle entered the intersection, the time when the vehicle exited, and the time it took in between the egress lane and the ingress lane. In other words, time information may include the time when a vehicle starts entering an intersection, measured relative to when the traffic light turned green. The time information may also include the time when the vehicle stops in the intersection while there is oncoming traffic. The time information may further include the time when the vehicle starts moving again after the oncoming traffic passes the vehicle. By adding the aforementioned time information into the training of the connectivity model, the connectivity model may be able to identify yield relationship. Such time information may be associated with the vehicle traffic-pattern data. As an example and not by way of limitation, the vehicle traffic-pattern data may further comprise a time period indicating that the vehicle has remained stationary in a location between an egress lane and an ingress lane during the time period and one or more other vehicles from an opposite direction have passed by the vehicle during that time period.

Besides lane connectivity and traffic rules, the computing system may additionally learn the general traffic situation with respect to different time. As an example and not by way of limitation, the computing system may learn that during morning rush hours and evening rush hours there is a lot of traffic in a region. The learned traffic situation may be used by the transportation management system for route planning. As another example and not by way of limitation, the computing system may encode the traffic-light state as a function of time of the day. Accordingly, the traffic patterns uncovered from the traffic data may be specific to each hour. For example, the traffic patterns may indicate that there are very few right-turns on red from lane 306 to lane 314 as displayed in FIGS. 3A-3B between 7 A.M. and 9 A.M. every weekday. The connectivity model, therefore, may be able to infer that vehicles are not allowed to make right-turns on red from lane 306 to lane 314 between 7 A.M. and 9 A.M. every weekday (the very few right-turns on red may be actually traffic violations).

In particular embodiments, the learned lane connectivity and traffic rules may be used to help generate a semantic map based on a geometric map of a region. In particular embodiments, generating the semantic map may comprise encoding the lane connectivity and the the traffic rules into the geometric map of the region. Geometric map is a map depicting structures that are above the ground. The learned lane connectivity and traffic rules may be used to annotate the geometric map with semantic information. Based on the semantic map, an autonomous driving vehicle may know when, where, and how it can turn from one lane to another lane. The autonomous driving vehicle may also know the yield relationship at the region by relying on the semantic map. As an example and not by way of limitation, the semantic map of the intersection as illustrated in FIG. 1 may integrate the geometric map of the intersection and the lane connectivity and traffic rules associated with the intersection. The geometric map may comprise the depiction of the lanes and traffic lights in the intersection. If an autonomous vehicle uses the semantic map as disclosed herein, it may be provided with information of the geometric structures of the intersection, lane connectivity, and traffic rules. For example, if the autonomous vehicle is at lane 112, the geometric map may indicate that the vehicle may either proceed straight when the traffic light 132 is green or turn right to lane 116 regardless the state of traffic light 132.

Figure 4:
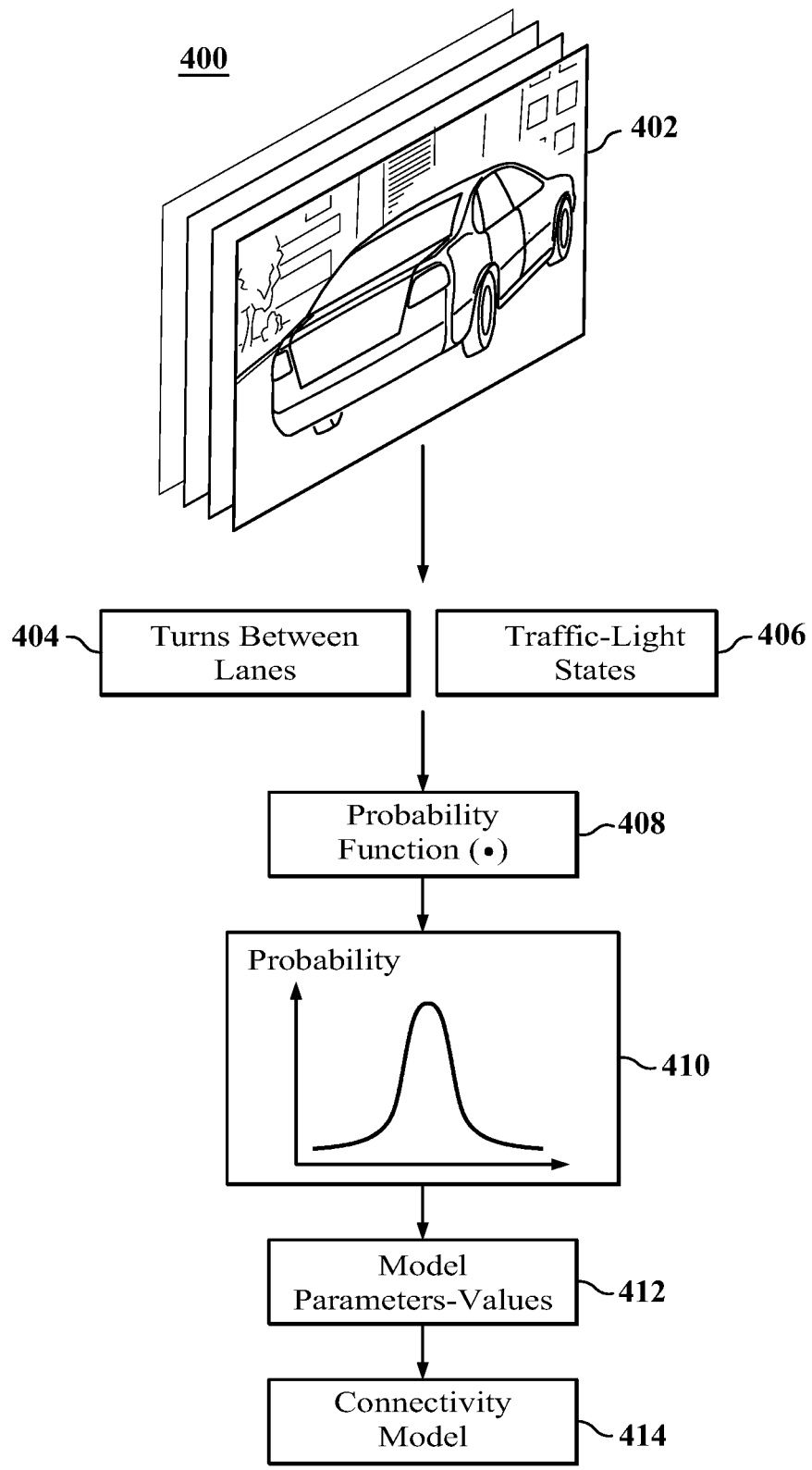
FIG. 4 illustrates an example diagram flow for training a connectivity model that is able to infer lane connectivity and traffic rules.

FIG. 4 illustrates an example diagram flow for training a connectivity model that is able to infer lane connectivity and traffic rules. As displayed in FIG. 4, the computing system may first access vehicle traffic-pattern data 402. The computing system may then determine lane connectivity between different lanes 404 and the corresponding traffic-light states 406. Next, training the connectivity model may comprise inputting, to a probability function 408, the vehicle traffic-pattern data 402. As an example and not by way of limitation, the probability function 408 may be based on Bayesian statistics. Training the connectivity model may also comprise outputting, by the probability function 408, a probability distribution 410 over one or more model-parameters associated with the connectivity model. Training the connectivity model may additionally comprise determining, based on the probability distribution 410, one or more model parameter-values 412 for the one or more model-parameters, respectively. Once the model parameter-values 412 are determined, the training process for the connectivity model 414 is completed. As the trained connectivity model 414 may be used for inferring different types of lane connectivity and traffic rules, the training process may be based on particular optimization approaches designed for particular lane connectivity and traffic rules. As an example and not by way of limitation, training the connectivity model 414 may be based on maximizing the probability indicative a vehicle being allowed to make a turn from a lane to another lane given a traffic-light state. As another example and not by way of limitation, training the connectivity model 414 may be based on minimizing the probability indicative a vehicle being forbidden to make a turn from a lane to another lane given a traffic-light state.

In particular embodiments, when training the connectivity model 414, the computing system may pre-process the vehicle traffic-pattern data 402. The computing system may generate, based on the vehicle traffic-pattern data, a first embedding representing an indication that the vehicle has moved from a first lane in the region corresponding to the first lane identifier to a second lane in the region corresponding to the second lane identifier. As an example and not by way of limitation, the first embedding may be a matrix form as it is associated with two variables, i.e., two lane identifiers. In particular embodiments, the computing system may also generate, based on the vehicle traffic-pattern data, a second embedding representing the traffic-light state. As an example and not by way of limitation, the second embedding may be a tensor form (i.e., three-dimensional) when it is associated with three variables, i.e., three traffic signals including green, yellow, and red. Correspondingly, training the connectivity model may comprise determining a correlation between the first embedding and the second embedding. As an example and not by way of limitation, the computing system may observe that a vehicle went from lane 302 to lane 308 as displayed in FIG. 3A. When the turn happened, the traffic-light state associated with the traffic lights TL1 320, TL2 322, and TL3 324 is (x,y,z) in which x, y, and z indicate the traffic signals of the traffic lights, respectively. In particular embodiments, the computing system may then learn the correlation between the matrix characterizing the turn from lane 302 to lane 308 and the tensor representing the traffic-light state. For example, when a turn happened, traffic light TL1 320 was always green. Traffic light TL2 322 was first red and then green, which may indicate traffic light TL2 322 is irrelevant to the turn. Similarly, traffic light TL3 324 may be irrelevant as well. The computing system may further infer the traffic rules based on such correlation.

In particular embodiments, the computing system may use the connectivity model 414 to infer different types of traffic rules. In particular embodiments, the computing system may use the connectivity model 414 to determine, for at least one egress lane in the region, a yield relationship indicating a vehicle in the egress lane should yield to oncoming traffic when making a turn onto one or more ingress lanes in the region. In particular embodiments, the computing system may use the connectivity model 414 to determine, for at least one egress lane in the region, a virtual geometric area. The virtual geometric area may indicate that a vehicle should take a path within the virtual geometric area when moving from the egress lane onto an ingress lane in the region.

Besides using a vehicle should take a path within the virtual geometric area when moving from the egress lane onto an ingress lane in the region to infer lane connectivity and traffic rules, the computing system may also use it to predict how a vehicle may drive at a later time based on current status associated with the vehicle. As an example and not by way of limitation, the computing system may receive an indication that a vehicle is at a particular egress lane in the region. The computing system may then determine a traffic-light state in the region. The computing system may further determine, by the connectivity model 414 based on the particular egress lane and the traffic-light state, a probability indicating the vehicle will move from the particular egress lane onto a particular ingress lane.

Figure 5A:
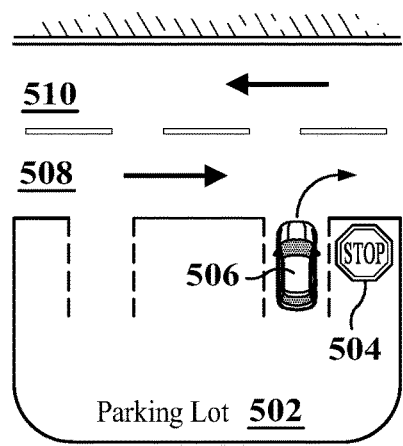
FIG. 5A illustrates an example parking lot adjacent to a two-way street.

FIGS. 5A-5E illustrate example different types of region for which the connectivity model 414 may be used to infer lane connectivity and traffic rules. FIG. 5A illustrates an example parking lot adjacent to a two-way street. As displayed in FIG. 5A, the computing system may use the connectivity model 414 to infer lane connectivity and traffic rules of entering and exiting the parking lot 502. In particular, there is a stop sign 504 instead of a traffic light. As an example and not by way of limitation, the connectivity model 414 may infer that before a vehicle 506 gets out of the parking lot 502, the vehicle 506 should stop at the stop sign 504. As another example and not by way of limitation, the connectivity model 414 may infer that when the vehicle 506 gets out of the parking lot 502 with a right turn, the vehicle 506 should yield to the traffic on lane 508 and the traffic on lane 510 is irrelevant. As yet another example and not by way of limitation, when a vehicle enters the parking lot 502 with a left turn from lane 510, the vehicle should yield to the traffic on lane 508.

Figure 5B:
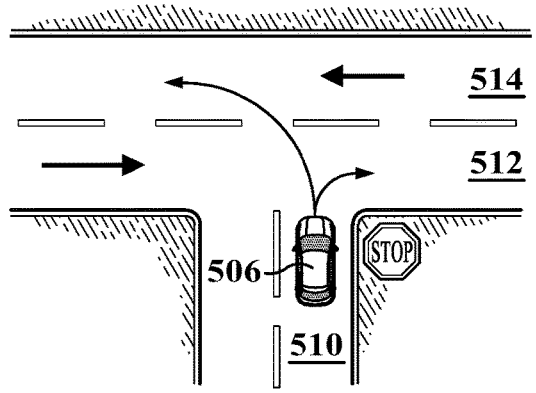
FIG. 5B illustrate an example T intersection.

FIG. 5B illustrate an example T intersection. As displayed in FIG. 5B, the computing system may use the connectivity model 414 to infer traffic rules of making a turn at the T intersection. In particular, there is a stop sign 504 instead of a traffic light. As an example and not by way of limitation, the connectivity model 414 may infer that before a vehicle 506 makes a turn, it should stop at the stop sign 504. As another example and not by way of limitation, the connectivity model 414 may infer that when the vehicle 506 makes a right turn from lane 510 to lane 512, the vehicle 506 should yield to the traffic on lane 512 and the traffic on lane 514 is irrelevant. As yet another example and not by way of limitation, the connectivity model 414 may infer that when the vehicle 506 makes a left turn from lane 510 to lane 514, the vehicle 506 should yield to the traffic on both lane 512 and lane 514.

Figure 5C:
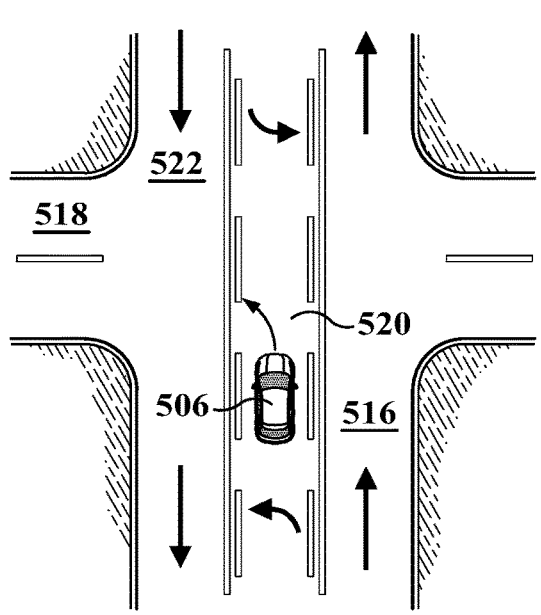
FIG. 5C illustrate another example intersection.

FIG. 5C illustrate another example intersection. As displayed in FIG. 5C, the computing system may use the connectivity model 414 to infer traffic rules of making a turn. As an example and not by way of limitation, the connectivity model 414 may infer that if a vehicle 506 wants to make a left turn from lane 516 to lane 518, the vehicle 506 should move to lane 520 first. As another example and not by way of limitation, the connectivity model 414 may infer that when the vehicle 506 makes a left turn from lane 520 to lane 518, the vehicle 506 should yield to the traffic on lane 522.

Figure 5D:
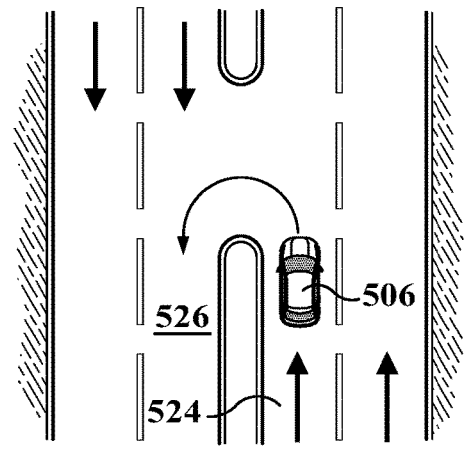
FIG. 5D illustrate an example two-way road.

FIG. 5D illustrate an example two-way road. As displayed in FIG. 5D, the computing system may use the connectivity model 414 to infer lane connectivity and traffic rules of making a U-turn. As an example and not by way of limitation, the connectivity model 414 may infer that a vehicle 506 can only make a U-turn from lane 524 to lane 526. As another example and not by way of limitation, the connectivity model 414 may infer that when the vehicle 506 makes a U-turn from lane 524 to lane 526, the vehicle 506 should yield to the traffic on lane 526.

Figure 5E:
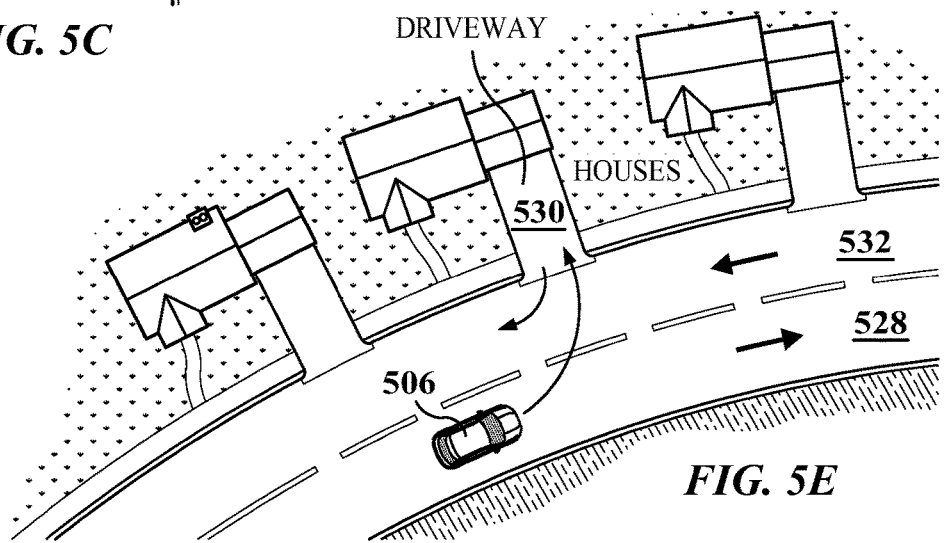
FIG. 5E illustrate an example residential neighborhood.

FIG. 5E illustrate an example residential neighborhood. As displayed in FIG. 5E, the computing system may use the connectivity model 414 to infer traffic rules of making a turn to a driveway. As an example and not by way of limitation, the connectivity model 414 may infer that when the vehicle 506 makes a left turn from lane 528 to the driveway 530, the vehicle 506 should yield to the traffic on lane 532.

Figure 6:
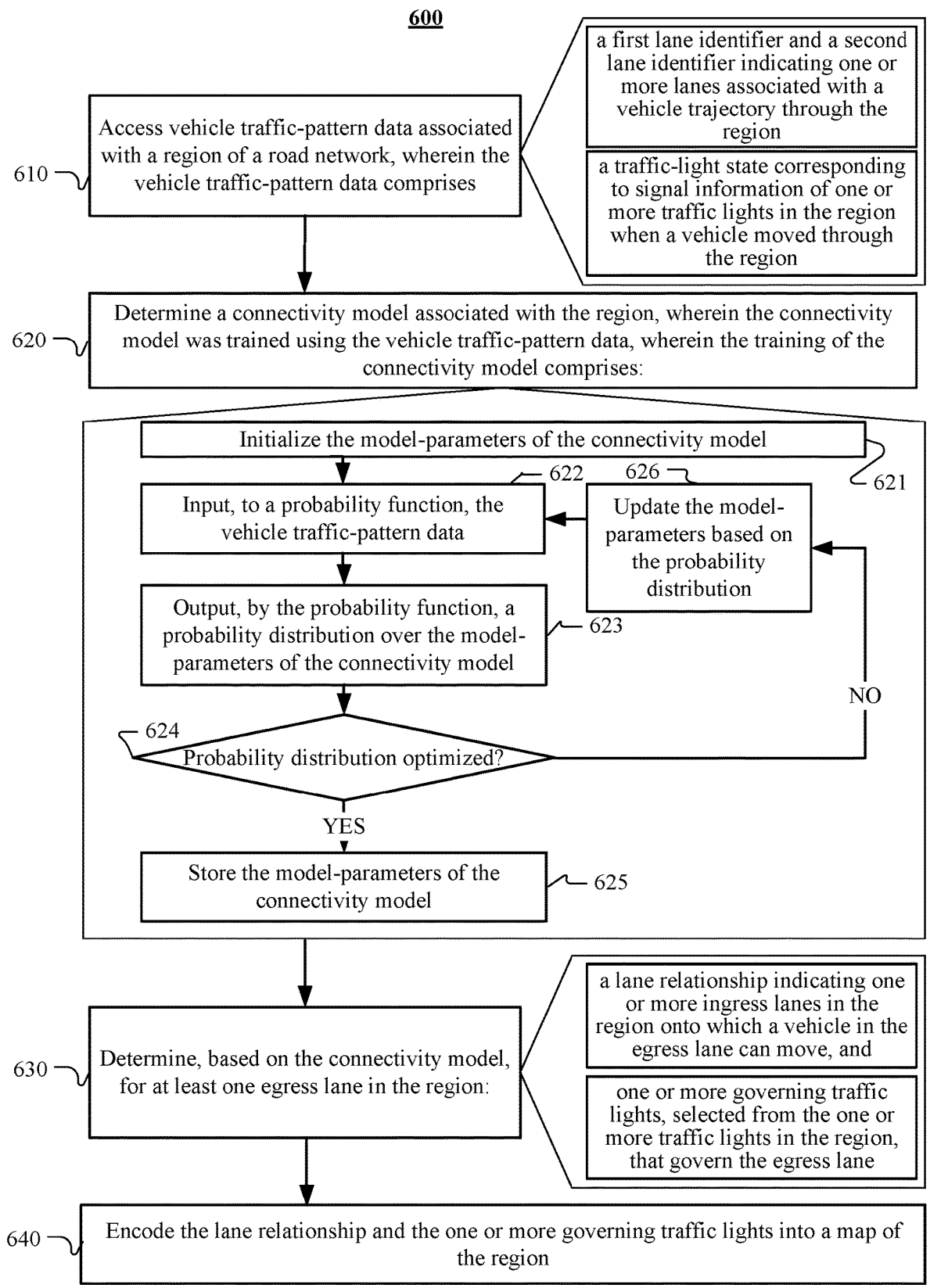
FIG. 6 illustrates an example of a method for using traffic patterns to determine lane connectivity and traffic rules.

FIG. 6 illustrates an example method 600 for using traffic patterns to determine lane connectivity and traffic rules. The method may begin at step 610, where a computing system may access vehicle traffic-pattern data associated with a region of a road network, wherein the vehicle traffic-pattern data comprises a first lane identifier and a second lane identifier indicating one or more lanes associated with a vehicle trajectory through the region and a traffic-light state corresponding to signal information of one or more traffic lights in the region when a vehicle moved through the region. At step 620, the computing system may determine a connectivity model associated with the region, wherein the connectivity model was trained using the vehicle traffic-pattern data. The training of the connectivity model may comprise the following sub-steps. At sub-step 621, the computing system may randomly initialize the model-parameters of the connectivity model. At sub-step 622, the computing system may input, to a probability function, the vehicle traffic-pattern data. At sub-step 623, the computing system may output, by the probability function, a probability distribution over the model-parameters associated with the connectivity model. At sub-step 624, the computing system may evaluate whether the probability distribution is optimized. If the probability distribution is optimized, at sub-step 625, the computing system may store the model-parameters of the connectivity model, which ends the training process. If the probability distribution is not optimized, at sub-step 626, the computing system may update the model-parameters based on the probability distribution. The computing system may then proceed to sub-step 622 to repeat the aforementioned iterative process until the probability distribution is optimized. At step 630, the computing system may determine, based on the connectivity model, for at least one egress lane in the region: a lane relationship indicating one or more ingress lanes in the region onto which a vehicle in the egress lane can move, and one or more governing traffic lights, selected from the one or more traffic lights in the region, that govern the egress lane. At step 640, the computing system may encode the lane relationship and the one or more governing traffic lights into a map of the region. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for using traffic patterns to determine traffic rules including the particular steps of the method of FIG. 6, this disclosure contemplates any suitable method for using traffic patterns to determine traffic rules including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
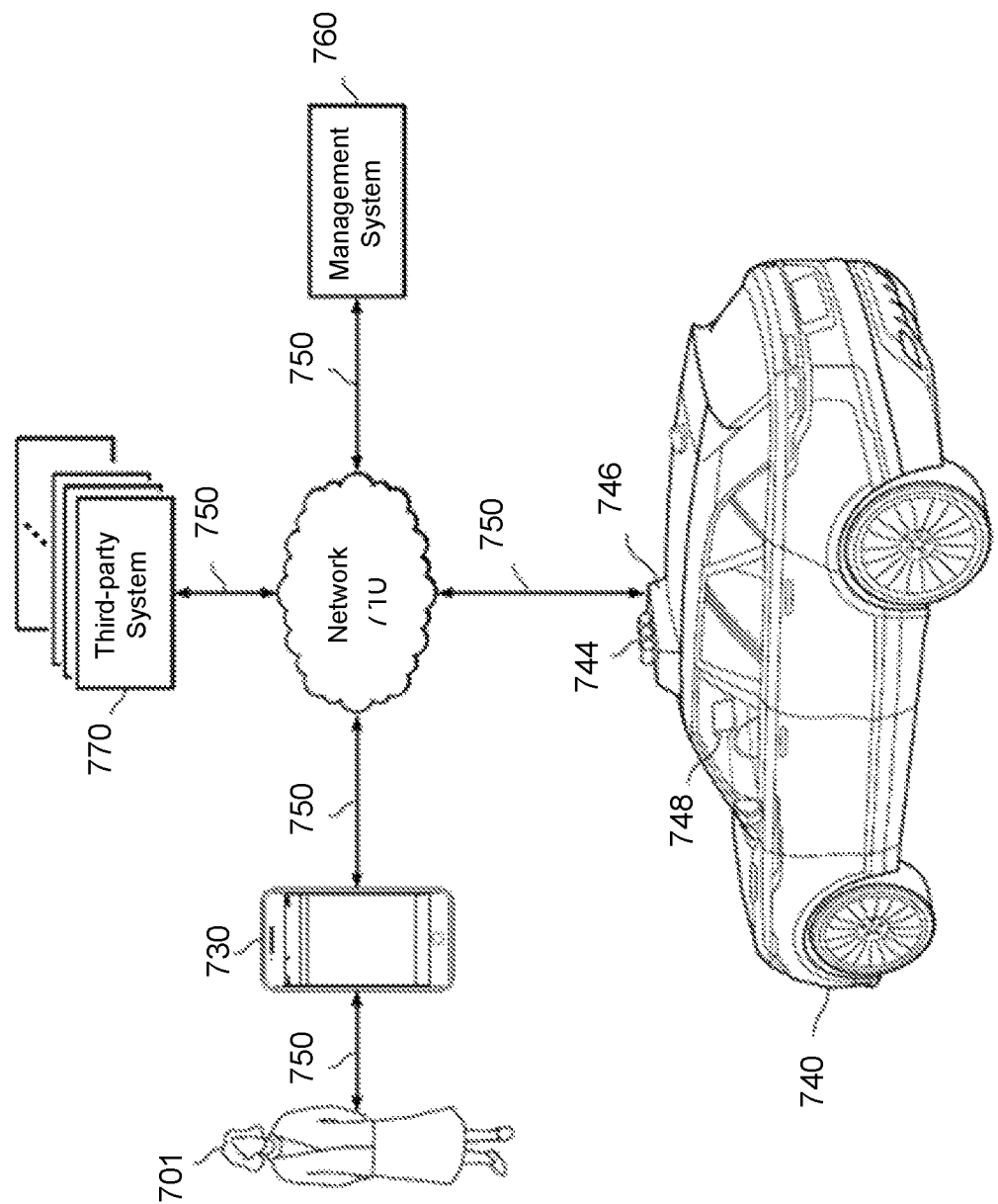
FIG. 7 illustrates an example block diagram of a transportation management environment for matching ride requestors with autonomous vehicles.

FIG. 7 illustrates an example block diagram of a transportation management environment for matching ride requestors with autonomous vehicles. In particular embodiments, the environment may include various computing entities, such as a user computing device 730 of a user 701 (e.g., a ride provider or requestor), a transportation management system 760, an autonomous vehicle 740, and one or more third-party system 770. The computing entities may be communicatively connected over any suitable network 710. As an example and not by way of limitation, one or more portions of network 710 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 7 illustrates a single user device 730, a single transportation management system 760, a single vehicle 740, a plurality of third-party systems 770, and a single network 710, this disclosure contemplates any suitable number of each of these entities. As an example and not by way of limitation, the network environment may include multiple users 701, user devices 730, transportation management systems 760, autonomous-vehicles 740, third-party systems 770, and networks 710.

The user device 730, transportation management system 760, autonomous vehicle 740, and third-party system 770 may be communicatively connected or co-located with each other in whole or in part. These computing entities may communicate via different transmission technologies and network types. For example, the user device 730 and the vehicle 740 may communicate with each other via a cable or short-range wireless communication (e.g., Bluetooth, NFC, WI-FI, etc.), and together they may be connected to the Internet via a cellular network that is accessible to either one of the devices (e.g., the user device 730 may be a smartphone with LTE connection). The transportation management system 760 and third-party system 770, on the other hand, may be connected to the Internet via their respective LAN/WLAN networks and Internet Service Providers (ISP). FIG. 7 illustrates transmission links 750 that connect user device 730, autonomous vehicle 740, transportation management system 760, and third-party system 770 to communication network 710. This disclosure contemplates any suitable transmission links 750, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 750 may connect to one or more networks 710, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 750. For example, the user device 730 may communicate with the transportation management system via a cellular network and the Internet, but communicate with the autonomous vehicle 740 via Bluetooth or a physical wire connection.

In particular embodiments, the transportation management system 760 may fulfill ride requests for one or more users 701 by dispatching suitable vehicles. The transportation management system 760 may receive any number of ride requests from any number of ride requestors 701. In particular embodiments, a ride request from a ride requestor 701 may include an identifier that identifies the ride requestor in the system 760. The transportation management system 760 may use the identifier to access and store the ride requestor's 701 information, in accordance with the requestor's 701 privacy settings. The ride requestor's 701 information may be stored in one or more data stores (e.g., a relational database system) associated with and accessible to the transportation management system 760. In particular embodiments, ride requestor information may include profile information about a particular ride requestor 701. In particular embodiments, the ride requestor 701 may be associated with one or more categories or types, through which the ride requestor 701 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 760 may classify a user 701 based on known information about the user 701 (e.g., using machine-learning classifiers), and use the classification to retrieve relevant aggregate information associated with that class. For example, the system 760 may classify a user 701 as a young adult and retrieve relevant aggregate information associated with young adults, such as the type of music generally preferred by young adults.

Transportation management system 760 may also store and access ride information. Ride information may include locations related to the ride, traffic data, route options, optimal pick-up or drop-off locations for the ride, or any other suitable information associated with a ride. As an example and not by way of limitation, when the transportation management system 760 receives a request to travel from San Francisco International Airport (SFO) to Palo Alto, Calif., the system 760 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 760. For example, historical data may include aggregate information generated based on past ride information, which may include any ride information described herein and telemetry data collected by sensors in autonomous vehicles and/or user devices. Historical data may be associated with a particular user (e.g., that particular user's preferences, common routes, etc.), a category/class of users (e.g., based on demographics), and/or all users of the system 760. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 760 in particular embodiments may predict and provide ride suggestions in response to a ride request. In particular embodiments, the system 760 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and/or semi-supervised learning based on a mixture of labeled and unlabeled training data.

In particular embodiments, transportation management system 760 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 760 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 730 (which may belong to a ride requestor or provider), a transportation management system 760, vehicle system 740, or a third-party system 770 to process, transform, manage, retrieve, modify, add, or delete the information stored in the data store.

In particular embodiments, transportation management system 760 may include an authorization server (or any other suitable component(s)) that allows users 701 to opt-in to or opt-out of having their information and actions logged, recorded, or sensed by transportation management system 760 or shared with other systems (e.g., third-party systems 770). In particular embodiments, a user 701 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 701 of transportation management system 760 through blocking, data hashing, anonymization, or other suitable techniques as appropriate.

In particular embodiments, third-party system 770 may be a network-addressable computing system that may provide HD maps or host GPS maps, customer reviews, music or content, weather information, or any other suitable type of information. Third-party system 770 may generate, store, receive, and send relevant data, such as, for example, map data, customer review data from a customer review website, weather data, or any other suitable type of data. Third-party system 770 may be accessed by the other computing entities of the network environment either directly or via network 710. For example, user device 730 may access the third-part system 770 via network 710, or via transportation management system 760. In the latter case, if credentials are required to access the third-party system 770, the user 701 may provide such information to the transportation management system 760, which may serve as a proxy for accessing content from the third-party system 770.

In particular embodiments, user device 730 may be a mobile computing device such as a smartphone, tablet computer, or laptop computer. User device 730 may include one or more processors (e.g., CPU and/or GPU), memory, and storage. An operating system and applications may be installed on the user device 730, such as, e.g., a transportation application associated with the transportation management system 760, applications associated with third-party systems 770, and applications associated with the operating system. User device 730 may include functionality for determining its location, direction, or orientation, based on integrated sensors such as GPS, compass, gyroscope, or accelerometer. User device 730 may also include wireless transceivers for wireless communication and may support wireless communication protocols such as Bluetooth, near-field communication (NFC), infrared (IR) communication, WI-FI, and/or 2G/3G/4G/LTE mobile communication standard. User device 730 may also include one or more cameras, scanners, touchscreens, microphones, speakers, and any other suitable input-output devices.

In particular embodiments, the vehicle 740 may be an autonomous vehicle and equipped with an array of sensors 744, a navigation system 746, and a ride-service computing device 748. In particular embodiments, a fleet of autonomous vehicles 740 may be managed by the transportation management system 760. The fleet of autonomous vehicles 740, in whole or in part, may be owned by the entity associated with the transportation management system 760, or they may be owned by a third-party entity relative to the transportation management system 760. In either case, the transportation management system 760 may control the operations of the autonomous vehicles 740, including, e.g., dispatching select vehicles 740 to fulfill ride requests, instructing the vehicles 740 to perform select operations (e.g., head to a service center or charging/fueling station, pull over, stop immediately, self-diagnose, lock/unlock compartments, change music station, change temperature, and any other suitable operations), and instructing the vehicles 740 to enter select operation modes (e.g., operate normally, drive at a reduced speed, drive under the command of human operators, and any other suitable operational modes).

In particular embodiments, the autonomous vehicles 740 may receive data from and transmit data to the transportation management system 760 and the third-party system 770. Example of received data may include, e.g., instructions, new software or software updates, maps, 3D models, trained or untrained machine-learning models, location information (e.g., location of the ride requestor, the autonomous vehicle 740 itself, other autonomous vehicles 740, and target destinations such as service centers), navigation information, traffic information, weather information, entertainment content (e.g., music, video, and news) ride requestor information, ride information, and any other suitable information. Examples of data transmitted from the autonomous vehicle 740 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 740, passengers may send/receive data to the transportation management system 760 and/or third-party system 770), and any other suitable data.

In particular embodiments, autonomous vehicles 740 may also communicate with each other as well as other traditional human-driven vehicles, including those managed and not managed by the transportation management system 760. For example, one vehicle 740 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) and/or over a network (e.g., the Internet or via the transportation management system 760 or third-party system 770).

In particular embodiments, an autonomous vehicle 740 may obtain and process sensor/telemetry data. Such data may be captured by any suitable sensors. For example, the vehicle 740 may have aa Light Detection and Ranging (LiDAR) sensor array of multiple LiDAR transceivers that are configured to rotate 360°, emitting pulsed laser light and measuring the reflected light from objects surrounding vehicle 740. In particular embodiments, LiDAR transmitting signals may be steered by use of a gated light valve, which may be a MEMs device that directs a light beam using the principle of light diffraction. Such a device may not use a gimbaled mirror to steer light beams in 360° around the autonomous vehicle. Rather, the gated light valve may direct the light beam into one of several optical fibers, which may be arranged such that the light beam may be directed to many discrete positions around the autonomous vehicle. Thus, data may be captured in 360° around the autonomous vehicle, but no rotating parts may be necessary. A LiDAR is an effective sensor for measuring distances to targets, and as such may be used to generate a three-dimensional (3D) model of the external environment of the autonomous vehicle 740. As an example and not by way of limitation, the 3D model may represent the external environment including objects such as other cars, curbs, debris, objects, and pedestrians up to a maximum range of the sensor arrangement (e.g., 50, 100, or 200 meters). As another example, the autonomous vehicle 740 may have optical cameras pointing in different directions. The cameras may be used for, e.g., recognizing roads, lane markings, street signs, traffic lights, police, other vehicles, and any other visible objects of interest. To enable the vehicle 740 to "see" at night, infrared cameras may be installed. In particular embodiments, the vehicle may be equipped with stereo vision for, e.g., spotting hazards such as pedestrians or tree branches on the road. As another example, the vehicle 740 may have radars for, e.g., detecting other vehicles and/or hazards afar. Furthermore, the vehicle 740 may have ultrasound equipment for, e.g., parking and obstacle detection. In addition to sensors enabling the vehicle 740 to detect, measure, and understand the external world around it, the vehicle 740 may further be equipped with sensors for detecting and self-diagnosing the vehicle's own state and condition. For example, the vehicle 740 may have wheel sensors for, e.g., measuring velocity; global positioning system (GPS) for, e.g., determining the vehicle's current geolocation; and/or inertial measurement units, accelerometers, gyroscopes, and/or odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, an autonomous vehicle 740 may build a 3D model of its surrounding based on data from its LiDAR, radar, sonar, and cameras, along with a pre-generated map obtained from the transportation management system 760 or the third-party system 770. Although sensors 744 appear in a particular location on autonomous vehicle 740 in FIG. 7, sensors 744 may be located in any suitable location in or on autonomous vehicle 740. Example locations for sensors include the front and rear bumpers, the doors, the front windshield, on the side panel, or any other suitable location.

In particular embodiments, the autonomous vehicle 740 may be equipped with a processing unit (e.g., one or more CPUs and GPUs), memory, and storage. The vehicle 740 may thus be equipped to perform a variety of computational and processing tasks, including processing the sensor data, extracting useful information, and operating accordingly. For example, based on images captured by its cameras and a machine-vision model, the vehicle 740 may identify particular types of objects captured by the images, such as pedestrians, other vehicles, lanes, curbs, and any other objects of interest.

In particular embodiments, the autonomous vehicle 740 may have a navigation system 746 responsible for safely navigating the autonomous vehicle 740. In particular embodiments, the navigation system 746 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 746 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 746 may use its determinations to control the vehicle 740 to operate in prescribed manners and to guide the autonomous vehicle 740 to its destinations without colliding into other objects. Although the physical embodiment of the navigation system 746 (e.g., the processing unit) appears in a particular location on autonomous vehicle 740 in FIG. 7, navigation system 746 may be located in any suitable location in or on autonomous vehicle 740. Example locations for navigation system 746 include inside the cabin or passenger compartment of autonomous vehicle 740, near the engine/battery, near the front seats, rear seats, or in any other suitable location.

In particular embodiments, the autonomous vehicle 740 may be equipped with a ride-service computing device 748, which may be a tablet or any other suitable device installed by transportation management system 760 to allow the user to interact with the autonomous vehicle 740, transportation management system 760, other users 701, or third-party systems 770. In particular embodiments, installation of ride-service computing device 748 may be accomplished by placing the ride-service computing device 748 inside autonomous vehicle 740, and configuring it to communicate with the vehicle 740 via a wire or wireless connection (e.g., via Bluetooth). Although FIG. 7 illustrates a single ride-service computing device 748 at a particular location in autonomous vehicle 740, autonomous vehicle 740 may include several ride-service computing devices 748 in several different locations within the vehicle. As an example and not by way of limitation, autonomous vehicle 740 may include four ride-service computing devices 748 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 748 may be detachable from any component of autonomous vehicle 740. This may allow users to handle ride-service computing device 748 in a manner consistent with other tablet computing devices. As an example and not by way of limitation, a user may move ride-service computing device 748 to any location in the cabin or passenger compartment of autonomous vehicle 740, may hold ride-service computing device 748, or handle ride-service computing device 748 in any other suitable manner. Although this disclosure describes providing a particular computing device in a particular manner, this disclosure contemplates providing any suitable computing device in any suitable manner.

Figure 8:
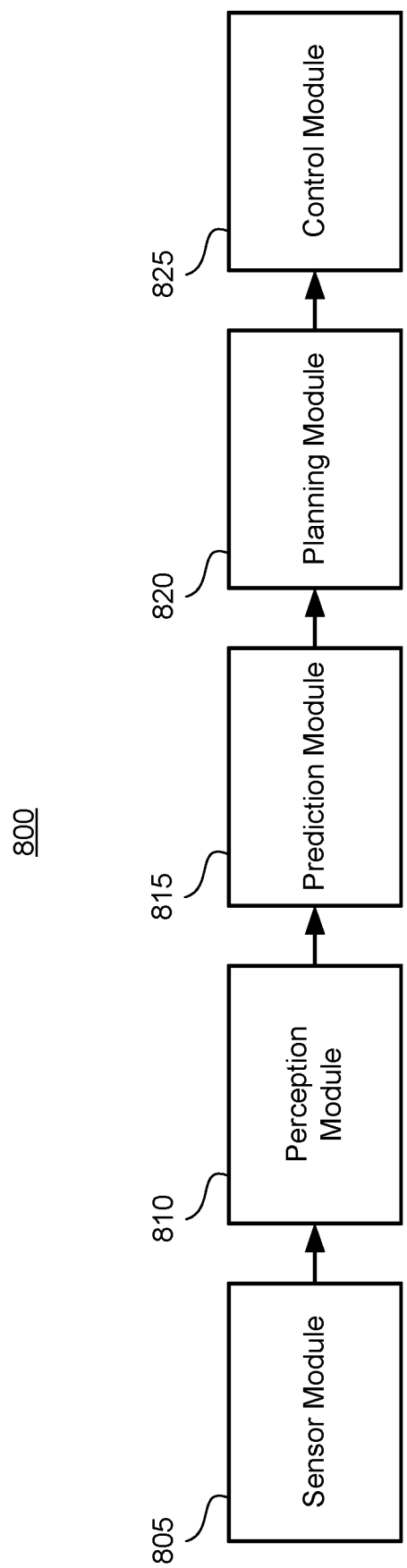
FIG. 8 illustrates an example of a processing pipeline for autonomous driving.

FIG. 8 illustrates an example block diagram of an algorithmic navigation pipeline. In particular embodiments, an algorithmic navigation pipeline 800 may include a number of computing modules, such as a sensor data module 805, perception module 810, prediction module 815, planning module 820, and control module 825. Sensor data module 805 may obtain and pre-process sensor/telemetry data that is provided to perception module 810. Such data may be captured by any suitable sensors of a vehicle. As an example and not by way of limitation, the vehicle may have a Light Detection and Ranging (LiDAR) sensor that is configured to transmit pulsed laser beams in multiple directions and measure the reflected signal from objects surrounding vehicle. The time of flight of the light signals may be used to measure the distance or depth of the objects from the LiDAR. As another example, the vehicle may have optical cameras pointing in different directions to capture images of the vehicle's surrounding. Radars may also be used by the vehicle for detecting other vehicles and/or hazards at a distance. As further examples, the vehicle may be equipped with ultrasound for close range object detection, e.g., parking and obstacle detection or infrared cameras for object detection in low-light situations or darkness. In particular embodiments, sensor data module 805 may suppress noise in the sensor data or normalize the sensor data.

Perception module 810 is responsible for correlating and fusing the data from the different types of sensors of the sensor module 805 to model the contextual environment of the vehicle. Perception module 810 may use information extracted by multiple independent sensors to provide information that would not be available from any single type of sensors. Combining data from multiple sensor types allows the perception module 810 to leverage the strengths of different sensors and more accurately and precisely perceive the environment. As an example and not by way of limitation, image-based object recognition may not work well in low-light conditions. This may be compensated by sensor data from LiDAR or radar, which are effective sensors for measuring distances to targets in low-light conditions. As another example, image-based object recognition may mistakenly determine that an object depicted in a poster is an actual three-dimensional object in the environment. However, if depth information from a LiDAR is also available, the perception module 810 could use that additional information to determine that the object in the poster is not, in fact, a three-dimensional object.

Perception module 810 may process the available data (e.g., sensor data, data from a high-definition map, etc.) to derive information about the contextual environment. For example, perception module 810 may include one or more agent modelers (e.g., object detectors, object classifiers, or machine-learning models trained to derive information from the sensor data) to detect and/or classify agents present in the environment of the vehicle (e.g., other vehicles, pedestrians, moving objects). Perception module 810 may also determine various characteristics of the agents. For example, perception module 810 may track the velocities, moving directions, accelerations, trajectories, relative distances, or relative positions of these agents. In particular embodiments, the perception module 810 may also leverage information from a high-definition map. The high-definition map may include a precise three-dimensional model of the environment, including buildings, curbs, street signs, traffic lights, and any stationary fixtures in the environment. Using the vehicle's GPS data and/or image-based localization techniques (e.g., simultaneous localization and mapping, or SLAM), the perception module 810 could determine the pose (e.g., position and orientation) of the vehicle or the poses of the vehicle's sensors within the high-definition map. The pose information, in turn, may be used by the perception module 810 to query the high-definition map and determine what objects are expected to be in the environment.

Perception module 810 may use the sensor data from one or more types of sensors and/or information derived therefrom to generate a representation of the contextual environment of the vehicle. As an example and not by way of limitation, the representation of the external environment may include objects such as other vehicles, curbs, debris, objects, and pedestrians. The contextual representation may be limited to a maximum range of the sensor array (e.g., 50, 100, or 200 meters). The representation of the contextual environment may include information about the agents and objects surrounding the vehicle, as well as semantic information about the traffic lanes, traffic rules, traffic signs, time of day, weather, and/or any other suitable information. The contextual environment may be represented in any suitable manner. As an example and not by way of limitation, the contextual representation may be encoded as a vector or matrix of numerical values, with each value in the vector/matrix corresponding to a predetermined category of information. For example, each agent in the environment may be represented by a sequence of values, starting with the agent's coordinate, classification (e.g., vehicle, pedestrian, etc.), orientation, velocity, trajectory, and so on. Alternatively, information about the contextual environment may be represented by a raster image that visually depicts the agent, semantic information, etc. For example, the raster image may be a birds-eye view of the vehicle and its surrounding, up to a predetermined distance. The raster image may include visual information (e.g., bounding boxes, color-coded shapes, etc.) that represent various data of interest (e.g., vehicles, pedestrians, lanes, buildings, etc.).

The representation of the present contextual environment from the perception module 810 may be consumed by a prediction module 815 to generate one or more predictions of the future environment. For example, given a representation of the contextual environment at time $t_0$, the prediction module 815 may output another contextual representation for time $t_1$. For instance, if the $t_0$ contextual environment is represented by a raster image, the output of the prediction module 815 may be another raster image (e.g., a snapshot of the current environment) that depicts where the agents would be at time $t_1$ (e.g., a snapshot of the future). In particular embodiments, prediction module 815 may include a machine-learning model (e.g., a convolutional neural network, a neural network, a decision tree, support vector machines, etc.) that may be trained based on previously recorded contextual and sensor data. For example, one training sample may be generated based on a sequence of actual sensor data captured by a vehicle at times $t_0$ and $t_1$. The captured data at times to and $t_1$ may be used to generate, respectively, a first contextual representation (the training data) and a second contextual representation (the associated ground-truth used for training). During training, the machine-learning model may process the first contextual representation using the model's current configuration parameters and output a predicted contextual representation. The predicted contextual representation may then be compared to the known second contextual representation (i.e., the ground-truth at time $t_1$). The comparison may be quantified by a loss value, computed using a loss function. The loss value may be used (e.g., via back-propagation techniques) to update the configuration parameters of the machine-learning model so that the loss would be less if the prediction were to be made again. The machine-learning model may be trained iteratively using a large set of training samples until a convergence or termination condition is met. For example, training may terminate when the loss value is below a predetermined threshold. Once trained, the machine-learning model may be used to generate predictions of future contextual representations based on current contextual representations.

Planning module 820 may determine the navigation routes and particular driving operations (e.g., slowing down, speeding up, stopping, swerving, etc.) of the vehicle based on the predicted contextual representation generated by the prediction module 815. In particular embodiments, planning module 820 may utilize the predicted information encoded within the predicted contextual representation (e.g., predicted location or trajectory of agents, semantic data, etc.) and any other available information (e.g., map data, traffic data, accident reports, weather reports, target destinations, and any other suitable information) to determine one or more goals or navigation instructions for the vehicle. As an example and not by way of limitation, based on the predicted behavior of the agents surrounding the vehicle and the traffic data to a particular destination, planning module 820 may determine a particular navigation path and associated driving operations for the vehicle to avoid possible collisions with one or more agents. In particular embodiments, planning module 820 may generate, based on a given predicted contextual presentation, several different plans (e.g., goals or navigation instructions) for the vehicle. For each plan, the planning module 820 may compute a score that represents the desirability of that plan. For example, if the plan would likely result in the vehicle colliding with an agent at a predicted location for that agent, as determined based on the predicted contextual representation, the score for the plan may be penalized accordingly. Another plan that would cause the vehicle to violate traffic rules or take a lengthy detour to avoid possible collisions may also have a score that is penalized, but the penalty may be less severe than the penalty applied for the previous plan that would result in collision. A third plan that causes the vehicle to simply stop or change lanes to avoid colliding with the agent in the predicted future may receive the highest score. Based on the assigned scores for the plans, the planning module 820 may select the best plan to carry out. While the example above used collision as an example, the disclosure herein contemplates the use of any suitable scoring criteria, such as travel distance or time, fuel economy, changes to the estimated time of arrival at the destination, passenger comfort, proximity to other vehicles, the confidence score associated with the predicted contextual representation, etc.

Based on the plan generated by planning module 820, which may include one or more navigation path or associated driving operations, control module 825 may determine the specific commands to be issued to the actuators of the vehicle. The actuators of the vehicle are components that are responsible for moving and controlling the vehicle. The actuators control driving functions of the vehicle, such as for example, steering, turn signals, deceleration (braking), acceleration, gear shift, etc. As an example and not by way of limitation, control module 825 may transmit commands to a steering actuator to maintain a particular steering angle for a particular amount of time to move a vehicle on a particular trajectory to avoid agents predicted to encroach into the area of the vehicle. As another example, control module 825 may transmit commands to an accelerator actuator to have the vehicle safely avoid agents predicted to encroach into the area of the vehicle.

Figure 9:
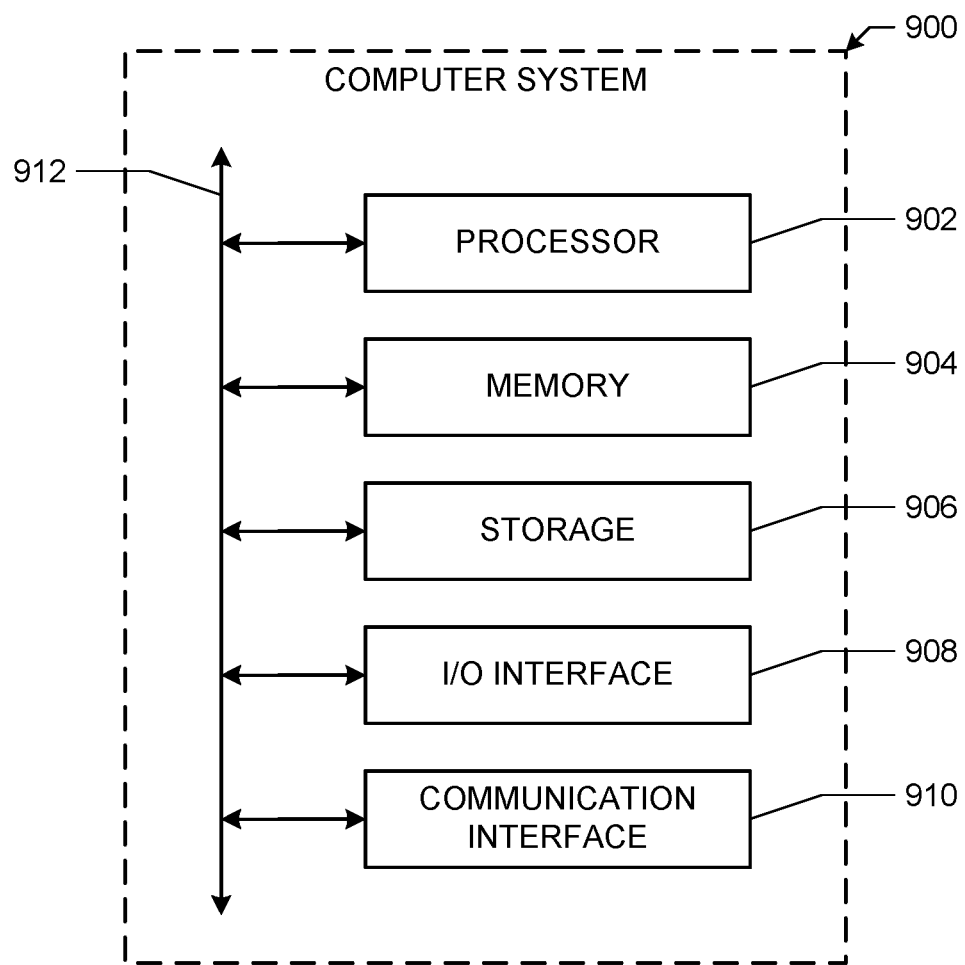
FIG. 9 illustrates an example of a computing system.

FIG. 9 illustrates an example computer system 900. In particular embodiments, one or more computer systems 900 perform one or more steps of one or more methods described or illustrated herein. In particular embodiments, one or more computer systems 900 provide the functionalities described or illustrated herein. In particular embodiments, software running on one or more computer systems 900 performs one or more steps of one or more methods described or illustrated herein or provides the functionalities described or illustrated herein. Particular embodiments include one or more portions of one or more computer systems 900. Herein, a reference to a computer system may encompass a computing device, and vice versa, where appropriate. Moreover, a reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 that are to be operated on by computer instructions; the results of previous instructions executed by processor 902 that are accessible to subsequent instructions or for writing to memory 904 or storage 906; or any other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs), be a multi-core processor, or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described in further detail below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
    collecting, by a fleet of a plurality of vehicles managed by a transportation management system, vehicle traffic-pattern data in a region of a road network, wherein the vehicle traffic-pattern data are captured by a plurality of sensors associated with the plurality of vehicles when operating in the region;
    determining, by the transportation management system, a connectivity model associated with the region, wherein the connectivity model was trained using the vehicle traffic-pattern data in the region, wherein the vehicle traffic-pattern data comprises:
        a first lane identifier indicating a first lane and a second lane identifier indicating a second lane, wherein the first and second lanes are associated with a vehicle's trajectory through the region, and
        a traffic-light state corresponding to signal information of a plurality of traffic lights in the region when the vehicle turned from the first lane to the second lane through the region;
    determining, by the transportation management system and based on the connectivity model, for at least one egress lane in the region:
        a lane relationship indicating one or more ingress lanes in the region which vehicles in the at least one egress lane can turn into; and
        virtual lane dividers defining an area which vehicles turning from the at least one egress lane into the one or more ingress lanes should stay within;
    identifying, by the transportation management system and based on the connectivity model, for the at least one egress lane in the region, one or more first traffic lights from the plurality of traffic lights in the region as one or more governing traffic lights that govern the at least one egress lane;
    encoding, by the transportation management system, the lane relationship, the virtual lane dividers, and the one or more governing traffic lights into a map of the region; and
    transmitting, by the transportation management system, the map of the region to a vehicle, wherein the map of the region is configured to be used by the vehicle to generate one or more navigation paths based on the lane relationship, the virtual lane dividers, and the one or more governing traffic lights encoded in the map of the region.

2. The method of claim 1, wherein the vehicle traffic-pattern data further comprises:
    a time period indicating that the vehicle has remained stationary in a location between the first lane corresponding to the first lane identifier and the second lane corresponding to the second lane identifier during the time period and one or more other vehicles from an opposite direction have passed by the vehicle during the time period.

3. The method of claim 2, further comprising:
    by the transportation management system, using the connectivity model to determine, for at least one egress lane in the region:
    a yield relationship indicating a vehicle in the at least one egress lane should yield to oncoming traffic when making a turn onto one or more ingress lanes in the region.

4. The method of claim 1, wherein the vehicle traffic-pattern data is generated based on sensor data captured in the region, and wherein the sensor data captured in the region comprises images, videos, LiDAR point clouds, radar signals, or any combination thereof.

5. The method of claim 4, further comprising:
    extracting, by the transportation management system and based on the sensor data, a plurality of vehicle trajectories indicating a path that a plurality of vehicles have taken when moving through the region, wherein the vehicle traffic-pattern data further comprises the plurality of vehicle trajectories.

6. The method of claim 5, further comprising:
by the transportation management system, using the connectivity model to determine, for at least one egress lane in the region:
a virtual geometric area, wherein the virtual geometric area indicates that a vehicle should take a path within the virtual geometric area when moving from the at least one egress lane onto an ingress lane in the region.

7. The method of claim 1, wherein the vehicle traffic-pattern data further comprises:
a time at which the vehicle arrived at a predetermined location in the first lane corresponding to the first lane identifier, wherein the traffic-light state corresponds to signal information of the plurality of traffic lights at a first time.

8. The method of claim 7, wherein the signal information of the plurality of traffic lights indicates each of the plurality of traffic lights being green, blinking green, yellow, blinking yellow, red, or blinking red.

9. The method of claim 1, further comprising:
generating, by the transportation management system and based on the vehicle traffic-pattern data, a first embedding representing an indication that the vehicle has moved from the first lane in the region corresponding to the first lane identifier to the second lane in the region corresponding to the second lane identifier; and
generating, by the transportation management system and based on the vehicle traffic-pattern data, a second embedding representing the traffic-light state; and
determining, by the transportation management system, a correlation between the first embedding and the second embedding.

10. The method of claim 9, wherein the connectivity model was trained further based on the correlation between the first embedding and the second embedding.

11. The method of claim 1, further comprising:
determining a traffic-light state in the region; and
determining, by the transportation management system using the connectivity model based on the at least one egress lane and the traffic-light state, a probability indicating the vehicle will move from the at least one egress lane onto a particular ingress lane.

12. The method of claim 1, wherein the region comprises one of more of an intersection, a parking lot, a two-way street, or a driveway, wherein the region comprises two or more additional lanes, and wherein the vehicle traffic-pattern data further comprises an indication of vehicle movement between the two or more additional lanes when the vehicle moved from the first lane to the second lane through the region.

13. The method of claim 1, wherein the vehicle traffic-pattern data comprises a plurality of vehicle trajectories associated with the region, and wherein the method further comprises:
training, by the transportation management system, the connectivity model, comprising:
analyzing, for each of the plurality of vehicle trajectories, time information associated with vehicle movement associated with the vehicle trajectory, wherein the time information is generated based in part on a measurement with respect to a traffic-light state associated with the vehicle trajectory.

14. The method of claim 1, further comprising training the connectivity model by the transportation management system, wherein the training comprises:
inputting, to a probability function, the vehicle traffic-pattern data;
outputting, by the probability function, a probability distribution over one or more model-parameters associated with the connectivity model; and
determining, based on the probability distribution, one or more model parameter-values for the one or more model-parameters, respectively.

15. The method of claim 14, wherein determining the one or more model parameter-values for the respective one or more model-parameters is further based on a particular optimization determined based on lane connectivity between the first and second lanes and traffic rules associated with the first and second lanes.

16. The method of claim 1, further comprising:
collecting, by the transportation management system, additional vehicle traffic-pattern data comprising one or more of sensor data captured by sensors installed in the region, satellite images associated with the region, or images captured by pedestrians in the region, wherein the connectivity model was trained further based on the additional vehicle traffic-pattern data.

17. The method of claim 1, wherein the one or more navigation paths comprise a first navigation path from the at least one egress lane into a particular ingress lane, and wherein the commands comprise a first command configured to cause the actuator to control the vehicle to turn from the at least one egress lane into the particular ingress lane within the virtual lane dividers encoded in the map.

18. The method of claim 1, further comprising:
determining, by the vehicle, that the vehicle is in the at least one egress lane in the region;
generating, by the vehicle, the one or more navigation paths based on the lane relationship, the virtual lane dividers, and the one or more governing traffic lights encoded in the map of the region;
generating, by the vehicle using the one or more navigation paths, commands to be issued to actuators of the vehicle; and
issuing, by the vehicle, the commands to the actuators to navigate the vehicle.

19. A system comprising: one or more processors and one or more computer-readable non-transitory storage media coupled to one or more of the processors, the one or more computer-readable non-transitory storage media comprising instructions operable when executed by one or more of the processors to cause the system to:
collect, by a fleet of a plurality of vehicles managed by a transportation management system, vehicle traffic-pattern data in a region of a road network, wherein the vehicle traffic-pattern data are captured by a plurality of sensors associated with the plurality of vehicles when operating in the region;
determine, by a transportation management system, a connectivity model associated with the region, wherein the connectivity model was trained using the vehicle traffic-pattern data in the region, wherein the vehicle traffic-pattern data comprises:
a first lane identifier indicating a first lane and a second lane identifier indicating a second lane, wherein the first and second lanes are associated with a vehicle's trajectory through the region, and a traffic-light state corresponding to signal information of a plurality of traffic lights in the region when the vehicle turned from the first lane to the second lane through the region;

determine, by the transportation management system and based on the connectivity model, for at least one egress lane in the region:

a lane relationship indicating one or more ingress lanes in the region which vehicles in the at least one egress lane can turn into; and virtual lane dividers defining an area which vehicles turning from the at least one egress lane into the one or more ingress lanes should stay within;

identify, by the transportation management system and based on the connectivity model, for the at least one egress lane in the region, one or more first traffic lights from the plurality of traffic lights in the region as one or more governing traffic lights that govern the at least one egress lane;

encode, by the transportation management system, the lane relationship, the virtual lane dividers, and the one or more governing traffic lights into a map of the region; and transmit, by the transportation management system, the map of the region to a vehicle, wherein the map of the region is configured to be used by the vehicle to generate one or more navigation paths based on the lane relationship, the virtual lane dividers, and the one or more governing traffic lights encoded in the map of the region.

20. The system of claim 19, wherein the vehicle traffic-pattern data further comprises:

a time period indicating that the vehicle has remained stationary in a location between the first lane corresponding to the first lane identifier and the second lane corresponding to the second lane identifier during the time period and one or more other vehicles from an opposite direction have passed by the vehicle during the time period.

21. The system of claim 20, wherein the processors are further operable when executing the instructions to perform operations comprising:

by the transportation management system, using the connectivity model to determine, for at least one egress lane in the region:

a yield relationship indicating a vehicle in the at least one egress lane should yield to oncoming traffic when making a turn onto one or more ingress lanes in the region.

22. The system of claim 19, wherein the vehicle traffic-pattern data is generated based on sensor data captured in the region, and wherein the sensor data captured in the region comprises images, videos, LiDAR point clouds, radar signals, or any combination thereof.

23. One or more computer-readable non-transitory storage media embodying software that is operable when executed to cause one or more processors to perform operations comprising:

collecting, by a fleet of a plurality of vehicles managed by a transportation management system, vehicle traffic-pattern data in a region of a road network, wherein the vehicle traffic-pattern data are captured by a plurality of sensors associated with the plurality of vehicles when operating in the region;

determining, by the transportation management system, a connectivity model associated with the region, wherein the connectivity model was trained using the vehicle traffic-pattern data in the region, wherein the vehicle traffic-pattern data comprises:

a first lane identifier indicating a first lane and a second lane identifier indicating a second lane, wherein the first and second lanes are associated with a vehicle's trajectory through the region, and a traffic-light state corresponding to signal information of a plurality of traffic lights in the region when the vehicle moved turned from the first lane to the second lane through the region;

determining, by the transportation management system and based on the connectivity model, for at least one egress lane in the region:

a lane relationship indicating one or more ingress lanes in the region which vehicles in the at least one egress lane can turn into; and virtual lane dividers defining an area which vehicles turning from the at least one egress lane into the one or more ingress lanes should stay within;

identifying, by the transportation management system and based on the connectivity model, for the at least one egress lane in the region, one or more first traffic lights from the plurality of traffic lights in the region as one or more governing traffic lights that govern the at least one egress lane;

encoding, by the transportation management system, the lane relationship, the virtual lane dividers, and the one or more governing traffic lights into a map of the region; and transmitting, by the transportation management system, the map of the region to a vehicle, wherein the map of the region is configured to be used by the vehicle to generate one or more navigation paths based on the lane relationship, the virtual lane dividers, and the one or more governing traffic lights encoded in the map of the region.

24. The media of claim 23, wherein the vehicle traffic-pattern data further comprises:

a time period indicating that the vehicle has remained stationary in a location between the first lane corresponding to the first lane identifier and the second lane corresponding to the second lane identifier during the time period and one or more other vehicles from an opposite direction have passed by the vehicle during the time period.

* * * * *